US012737616B2

(12) United States Patent
Hofer et al.

(10) Patent No.: US 12,737,616 B2
(45) Date of Patent: Sep. 15, 2026

(54) COMPUTING TECHNOLOGIES FOR PRESERVING SIGNALS IN DATA INPUTS WITH MODERATE TO HIGH LEVELS OF VARIANCES IN DATA SEQUENCE LENGTHS FOR ARTIFICIAL NEURAL NETWORK MODEL TRAINING

(71) Applicant: MERLN, LLC, Irving, TX (US)

(72) Inventors: Justin Hofer, O'Fallon, MO (US); Ben Vierck, Ballwin, MO (US); Jeremy Slater, Friendswood, TX (US)

(73) Assignee: MERLN, LLC, Irving, TX (US)

( * ) Notice: Subject to any disclaimer, the term of this patent is extended or adjusted under 35 U.S.C. 154(b) by 854 days.

(21) Appl. No.: 17/926,125

(22) PCT Filed: May 7, 2021

(86) PCT No.: PCT/US2021/031401

§ 371 (c)(1),
(2) Date: Nov. 17, 2022

(87) PCT Pub. No.: WO2021/236362

PCT Pub. Date: Nov. 25, 2021

(65) Prior Publication Data

US 2023/0177325 A1 Jun. 8, 2023

Related U.S. Application Data

(60) Provisional application No. 63/027,269, filed on May 19, 2020.

(51) Int. Cl.
*G06N 3/08* (2023.01)
*G06N 3/044* (2023.01)

(52) U.S. Cl.
CPC .............. *G06N 3/08* (2013.01); *G06N 3/044* (2023.01)

(58) Field of Classification Search
CPC ..... G06N 3/02–105; G06N 3/08–0985; G06N 3/044–0442
See application file for complete search history.

(56) References Cited

U.S. PATENT DOCUMENTS 10,318,882 B2 * 6/2019 Brueckner ............ G06N 20/00
2020/0075167 A1 3/2020 Srivastava
(Continued)

FOREIGN PATENT DOCUMENTS

CN 109978228 7/2019

OTHER PUBLICATIONS

Yoon, Sung-Hyun, and Ha-Jin Yu. "A simple distortion-free method to handle variable length sequences for recurrent neural networks in text dependent speaker verification." Applied Sciences 10.12 (2020): 4092. (Year: 2020).*

(Continued)

*Primary Examiner* — Liang Y Li
(74) *Attorney, Agent, or Firm* — Dentons US LLP

(57) ABSTRACT

This disclosure enables various computing technologies for various data science techniques to preserve signals in data inputs with moderate to high levels of variances in data sequence lengths for artificial neural network model training. These data science techniques can be helpful for dealing with time series or non-fixed-length time spans or other forms of discretized, parsed, or tokenized data. Some technological effects of utilizing these data science techniques can be technologically equivalent to getting more relevant training data, which can allow a model of a neural network to be trained to a high level of accuracy.

18 Claims, 31 Drawing Sheets

(56) References Cited

U.S. PATENT DOCUMENTS

| | | | | |
|---|---|---|---|---|
| 2020/0249918 | A1* | 8/2020 | Svyatkovskiy | G06N 3/084 |
| 2020/0336155 | A1* | 10/2020 | Ovsiannikov | H03M 7/6005 |

OTHER PUBLICATIONS

Dwarampudi, Mahidhar, and N. V. Reddy. "Effects of padding on LSTMs and CNNs." arXiv preprint arXiv:1903.07288 (2019). (Year: 2019).*

Data Science, Training with multi-series of different length with stateful LSTM, downloaded from internet Nov. 23, 2022, https://datascience.stackexchange.com/questions/34006/training-with-multi-series-of-different-length-with-stateful-lstm (3 pages).

Keras-Team, Is it possible to use a stateful LSTM with a long time series, downloaded from internet Nov. 23, 2022, https://github.com/keras-team/keras/issues/7996 (2 pages).

Stack Overflow, How LSTM deal with variable length sequence, downloaded from internet Nov. 23, 2022, https://stackoverflow.com/questions/49925374/how-lstm-deal-with-variable-length-sequence (4 pages).

Towards Data Science, Neural Network Embeddings Explained, How deep learning can represent War and Peace as a vector, downloaded from internet Nov. 23, 2022, https://towardsdatascience.com/neural-network-embeddings-explained-4d028e6f0526 (11 pages).

International Search Report and Written Opinion dated Sep. 29, 2021 in related International Application PCT/US2021/031401 filed May 7, 2021 (10 pages).

* cited by examiner

Column 1 Column 2 Column 3 Column 4 Column 5

Sample C

Sample E

Sample F

Sample H

Sample A

Sample B

Sample I

Sample D

Sample G

| | Batch 1 | Batch 2 | Batch 3 | Batch 4 | Batch 5 | Batch 6 | Batch 7 |
|---|---|---|---|---|---|---|---|
| VROW 1 | C C C C | | | | | | |
| VROW 2 | E E E E | | | | | | |
| VROW 3 | F F F F | | | | | | |

| | Batch 1 | | | | Batch 2 | | | | Batch 3 | | | | Batch 4 | | | | Batch 5 | | | | Batch 6 | | | | Batch 7 | | | |
|---|---|---|---|---|---|---|---|---|---|---|---|---|---|---|---|---|---|---|---|---|---|---|---|---|---|---|---|---|
| VROW 1 | C | C | C | C | H | H | H | H | H | H | H | H | H | H | H | H | H | H | H | H | H | H | H | H | | | | |
| VROW 2 | E | E | E | E | A | A | A | A | B | B | B | B | B | B | B | B | B | B | B | B | D | D | D | D | | | | |
| VROW 3 | F | F | F | F | F | F | F | F | F | F | F | F | I | I | I | I | I | I | I | I | I | I | I | I | | | | |

| | Batch 1 | | | | Batch 2 | | | | Batch 3 | | | | Batch 4 | | | | Batch 5 | | | | Batch 6 | | | | Batch 7 | | | |
|---|---|---|---|---|---|---|---|---|---|---|---|---|---|---|---|---|---|---|---|---|---|---|---|---|---|---|---|---|
| VROW 1 | C | C | C | C | H | H | H | H | H | H | H | H | H | H | H | H | H | H | H | H | H | H | H | H | G | G | G | G |
| VROW 2 | E | E | E | E | A | A | A | A | B | B | B | B | B | B | B | B | B | B | B | B | D | D | D | D | D | D | D | D |
| VROW 3 | F | F | F | F | F | F | F | F | F | F | F | F | I | I | I | I | I | I | I | I | I | I | I | I | I | I | I | I |

Legend x: Sequential input data. E.g. a word in a sentence, an EEG voltage reading, a stock price.

O: The output. E.g., the next word on a sentence, an EEG diagnosis, a stock trend prediction.

h: The main block of the RNN, containing the weights and the activation functions of the network.

U, V, W: Weights of the hidden layer

COMPUTING TECHNOLOGIES FOR PRESERVING SIGNALS IN DATA INPUTS WITH MODERATE TO HIGH LEVELS OF VARIANCES IN DATA SEQUENCE LENGTHS FOR ARTIFICIAL NEURAL NETWORK MODEL TRAINING

CROSS-REFERENCE TO RELATED PATENT APPLICATION

This patent application claims a benefit of priority to PCT International Application PCT/US2021/031401 filed 7 May 2021; which claims a benefit of priority to U.S. Provisional Patent Application 63/027,269 filed 19 May 2020, each of which is incorporated by reference herein in its entirety for all purposes.

TECHNICAL FIELD

This disclosure relates to various data science techniques for preserving signals in data inputs with moderate to high levels of variances in data sequence lengths for artificial neural network model training.

BACKGROUND

A recurrent neural network (RNN) is a type of an artificial neural network (ANN). The RNN has a plurality of nodes and a plurality of logical connections between the nodes such that the logical connections form a directed graph along a temporal sequence in order to exhibit a temporal dynamic behavior. This configuration allows each of the nodes to have an internal state (e.g., a memory) that can be used to process variable length sequences of inputs.

The RNN is currently unable to preserve a signal when given an input which has moderate to high levels of variance in data sequence length. In particular, an acceptable dataset for a stateful RNN is one in which there is a large quantity of samples of data, some, many, most, or all with a same or sufficiently similar length. As such, the stateful RNN can pre-allocate a memory space with a plurality of memory blocks and then use the memory blocks in order to train itself. The stateful RNN can have a model and mandate at least some uniformity in data sequence length for the model. Such uniformity enables the model to process at least some of the samples of data in an efficient and consistent manner.

An acceptable data series has minimum or no variance in sequence length and can have a same or sufficiently similar quantity of samples of data. For example, the acceptable data series can include a collection of 10 (or less or more) seconds of electroencephalography EEG data, with some of the samples containing data indicating a presence of seizures and some of the samples containing data indicating an absence of seizures. Therefore, the model of the RNN can process some, many, most or all of these samples of data in a batch format and be trained to discriminate between these two event classes (presence seizures versus absence of seizures).

FIG. 1 shows an example of the acceptable data series represented as a grid (e.g., a data structure, an array) having a plurality of cells defined by a plurality of rows and a plurality of columns that logically intersect each other. The cells are populated with a plurality of data values (represented as individual circles of varying color). Each of the rows defines a sequence by a sample of data (e.g., a text sentence with a set of words, a set of voltage readings over a time period, a set of financial security prices over a time period). Each of the columns defines a distinct unit of partitioning or parsing a sample of data (e.g., data token, unit of time). As such, each of the cells is populated with one data value (e.g., a word, a single voltage reading for a moment in time, a single point-in-time price of a financial security) within that sample of data. Note that at least some real-world data in each of the cells may have any quantity of dimensions and depth. Likewise, note that the data values correspond to one of three colors: red, blue, or black (although more or less data values are possible).

FIG. 2 shows an example of a low level of variance relative to the acceptable data series, in terms of a quantity of samples of data that vary. This low level of variance can be mitigated. For example, Sample B may be discarded and there may be a minimal effect on training and efficacy of a trained RNN.

FIG. 3 shows an example of a low level of variance relative to the acceptable data series, in terms of a degree to which the samples of data vary in length. This low level of variance can be mitigated. For example, all of the samples may be truncated to a length of a smallest sample of data or all of the samples of data less than a maximum length may be padded and there may be a minimal effect on training and efficacy of a trained RNN.

FIG. 4 shows an example of a moderate to high level of variance relative to the acceptable data series. This moderate to high level of variance may cause at least some training of a stateful RNN to become technologically difficult, time-consuming, and laborious. In particular, in the acceptable data series, at least some training involves various training algorithms and these algorithms have generally consistent and easily implemented rules. As such, these algorithms can train large quantities of samples of data in parallel via a technique called batch processing that involves a plurality of batches. In order to process these batches efficiently, the batch processing mandates at least some consistency in data shape. This consistency allows for a rapid training of the RNN and provides various technological benefits to such training by stabilizing learning. Therefore, when a data series has variable length sequences (e.g., moderate to high level of variance), this assumption no longer holds. There exist multiple workarounds for this issue. These workarounds include cropping the samples of data that will be used for training of the RNN, discarding the samples of data that will be used for training the RNN, and padding the samples of data that will be used for training the RNN.

FIG. 5 shows an example of cropping samples of data within a data series. This technique for managing variance involves cropping a sequence-length of each of the samples of data within the data series to an identical length. Cropping the samples of data within the data series can be used when most of the samples of data within the data series have an identical or sufficiently similar length, but some of the samples of data within the data series are too long relative to those samples of data within the data series that have the identical or sufficiently similar length.

There are several technological problems that can arise when cropping the samples of data within the data series. First, if the samples of data within the data series contain a relevant signal and the samples of data within the data series are cropped, which can involve cropping the relevant signal, then the RNN may perform poorly or not at all. Second, if the model of the RNN trained using an arbitrary crop-length is applied to make various inferences on real-world data whose sequence length exceeds the arbitrary crop-length, then this application may result in some undefined behavior. For example, the model of the RNN may perform in some, many, most, or all instances, but this performance may vary wildly depending on other characteristics of the real-world data and the model of the RNN.

FIG. 6 shows an example of discarding samples of data within a data series. This technique for managing variance involves discarding the samples of data within the data series with shorter or shortest sequences. Discarding the samples of data within the data series can be used when most of the sequences within the data series have an identical or sufficiently similar length, but some of the sequences within the data series are too short relative to those samples of data within the data series that have the identical or sufficiently similar length.

There are several technological problems that can arise when discarding the samples of data within the data series. First, if those discarded samples contain a relevant signal that is underrepresented in the samples of data that are remaining, then such remaining data series may result in the RNN that, when deployed, underperforms when the RNN encounters that same or sufficiently similar signal. Second, if the model of the RNN is applied to make inferences on real-world data against a dataset of similarly short data sequences, then the model of the RNN may behave in an undefined manner. For example, the model of the RNN may perform in some, many, most, or all instances, but this performance may vary wildly depending on other characteristics of the real-world data and the model of the RNN.

FIG. 7 shows an example of padding samples of data within a data series. This technique for managing variance involves identifying samples of data in the data series that are shorter in length relative to full or longest samples of data in the data series. Then, those shorter samples of data are padded such that all samples of data within the data series match in length. This technique can be used when none of the samples of data within the data series have an identical or sufficiently similar length.

There are several technological problems that can arise when padding the samples of data within the data series. First, the samples of data are artificially adjusted into a form that is not likely to exist in real-world data. Second, this artificial adjustment can lead to at least some undefined behavior in the RNN, issues with training the model of the RNN, and some negative effect on training performance of the model of the RNN. Third, when the model of the RNN is trained by the samples of data that have been padded and then the model of the RNN is exposed to the real-world data, then the model may see a padding sequence that the model has not seen before and there is uncertainty in knowing or predicting how the model of the RNN will perform. For example, if a relevant signal occurs 3 seconds into a data sequence, then the model of the RNN may have difficulty learning that relevant signal if, through padding, a relevant event is pushed to some random locations within the data sequence. Fourth, padding the samples of data can lead to increased memory consumption and longer epoch times, which is already problematic in deep learning. Although some of these technological problems can be reduced in severity by an intelligent and dynamic sample weighting scheme, there is at least some training impact to the model of the RNN that remains. As such, given (a) how large and complicated these datasets are and (b) how padding the samples of data negatively impacts computational resources (e.g., processing, memory, network), these factors often lead to disqualification of padding altogether when attempting to handle the moderate to high level of variance.

As explained above, cropping, discarding, and padding samples of data can technologically underperform when applied to a high variance in sequence length per sample of data. In particular, FIG. 8 shows a data series having a high variance. Therefore, as shown in FIG. 9, when the data series with the high variance is cropped in accordance with a data sample within the data series having a shortest length relative to other samples of data within the data series, then many data values can be lost and there can be a large reduction in temporal signal. Likewise, as shown in FIG. 10, when the data series with the high variance is accessed and there is a discarding of the samples of data within the data series whose segment lengths are less than a greatest length relative to other samples of data within the data series, then many data values can be lost and a quantity of samples of data can be decreased dramatically. Similarly, as shown in FIG. 11, when the data series with the high variance is accessed and there is a padding of the samples of data within the data series whose segment lengths are less than a greatest length relative to other samples of data within the data series, then most of those sequences are padded, which can be detrimental to training performance of the model of the RNN. For example, the RNN is not typically designed with large runs of artificially-introduced padding because such padding may prevent at least some convergence of training the model of the RNN.

SUMMARY

Broadly, this disclosure enables various computing technologies for various data science techniques to preserve signal in data inputs with moderate to high levels of variances in data sequence lengths for artificial neural network model training. These data science techniques can address various technological concerns, as explained above, and can be helpful for dealing with time series or non-fixed-length time spans or other forms of discretized, parsed, or tokenized data. Some technological effects of utilizing these data science techniques can be technologically equivalent to getting more relevant training data, which can allow a model of a neural network (e.g., an RNN) to be trained to a high level of accuracy. Some of these data science techniques include a construction of a virtual batch, where at least some data samples are swapped in and out, and a technique of resetting a global state of a stateful RNN (or another ANN) that is sensitive to a state of the virtual batch in which only at least some state information relating to those swapped samples is reset in the virtual batch. For example, the technique for resetting the global state can reset various internal states relevant to new virtual data segments for various components of the stateful RNN (or another ANN).

In an embodiment, there is a method of preserving signals in data inputs with moderate to high levels of variances in data sequence lengths for artificial neural network model training. The method comprises: accessing, by a processor, a data series containing a plurality of data samples that are organized in a first order within the data series, wherein each of the data samples contains a plurality of data values that are sequentially arranged within that respective data sample, wherein the data samples have a plurality of sequence lengths that vary from each other based on the data values in those respective data samples; randomizing, by the processor, the data samples within the data series such that the data samples are organized in a second order within the data series, wherein the first order is different from the second order; segmenting, by the processor, the data series organized in the second order according to a window size such that the data series are segmented into a plurality of data columns sized based on the window size; removing, by the processor, all of the data values of each respective data sample that does not satisfy the window size within each respective data column such that a modified data series remains; and constructing, by the processor, a plurality of virtual batches from the modified data series such that the virtual batches (a) each has a plurality of rows according to a batch size, (b) each is sized according to the window size and the batch size, (c) have the rows list all of the data values from the modified data series, and (d) have each of the rows sequentially contain the data values from only one of the data samples of the modified data series.

In an embodiment, there is a system for preserving signals in data inputs with moderate to high levels of variances in data sequence lengths for artificial neural network model training. The system comprises: a server programmed to: access a data series containing a plurality of data samples that are organized in a first order within the data series, wherein each of the data samples contains a plurality of data values that are sequentially arranged within that respective data sample, wherein the data samples have a plurality of sequence lengths that vary from each other based on the data values in those respective data samples; randomize the data samples within the data series such that the data samples are organized in a second order within the data series, wherein the first order is different from the second order; segment the data series organized in the second order according to a window size such that the data series are segmented into a plurality of data columns sized based on the window size; remove all of the data values of each respective data sample that does not satisfy the window size within each respective data column such that a modified data series remains; and construct a plurality of virtual batches from the modified data series such that the virtual batches (a) each has a plurality of rows according to a batch size, (b) each is sized according to the window size and the batch size, (c) have the rows list all of the data values from the modified data series, and (d) have each of the rows sequentially contain the data values from only one of the data samples of the modified data series.

DETAILED DESCRIPTION

Figure 1:
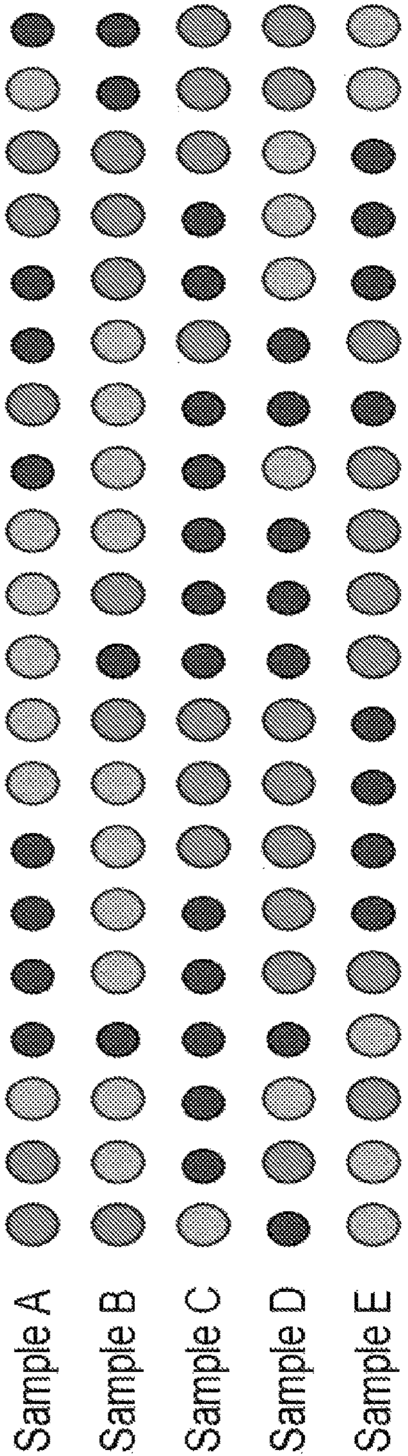
FIGS. 1-11 show various diagrams of data sequences according to this disclosure.
Figure 2:
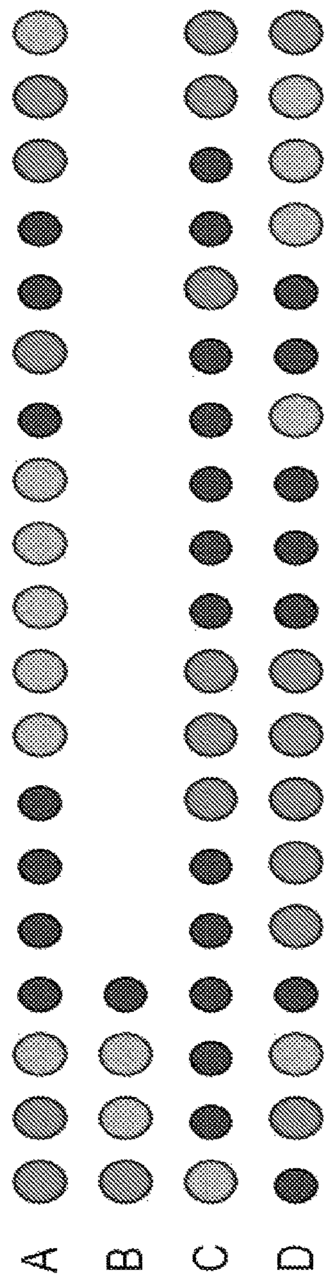
Figures 3, 4:
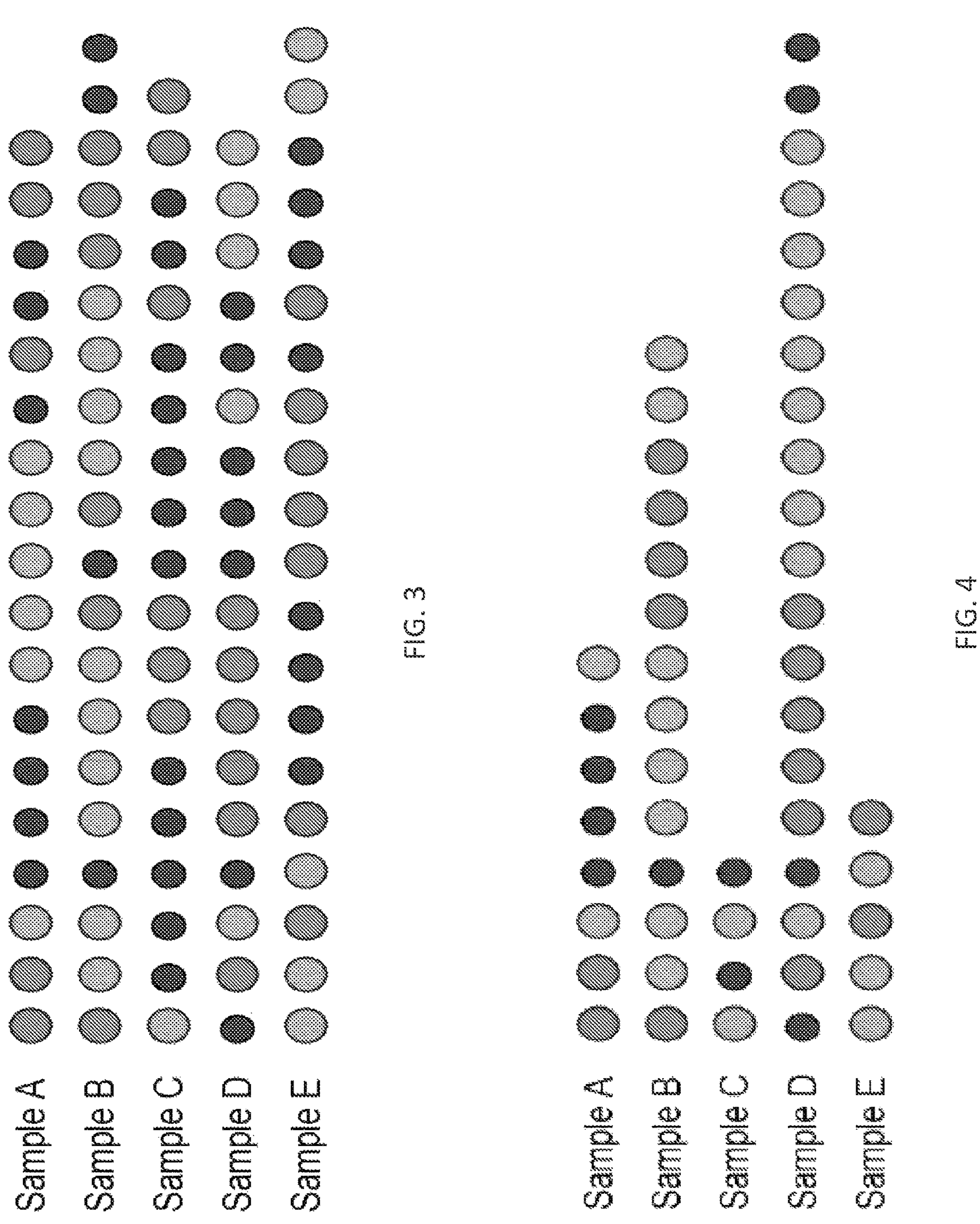
Figure 5:
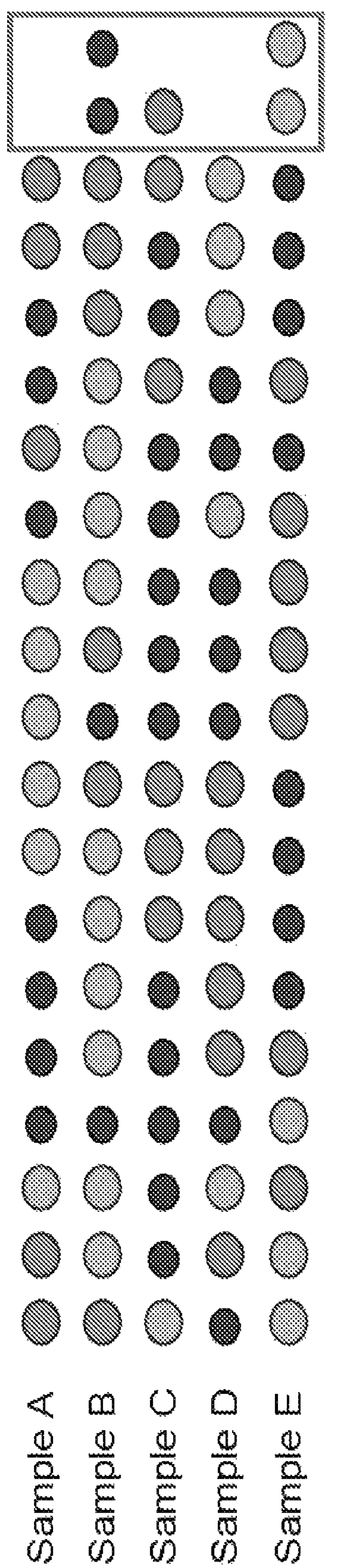
Figure 5:
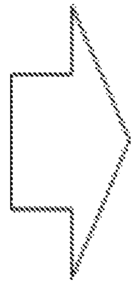
Figure 5:
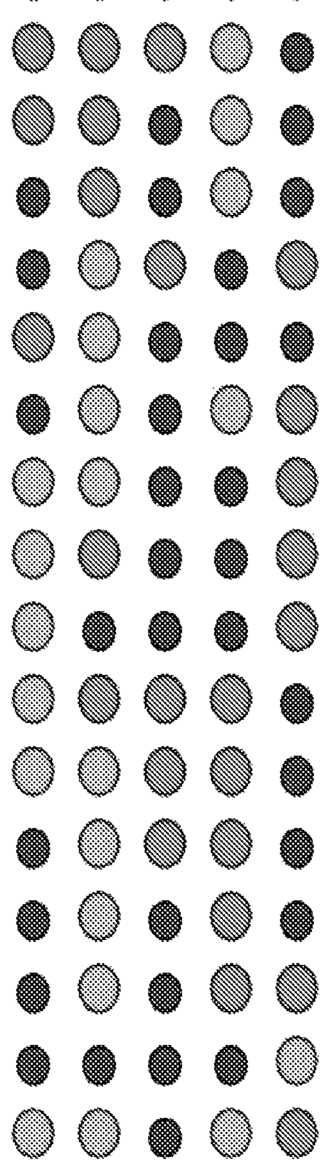
Figure 6:
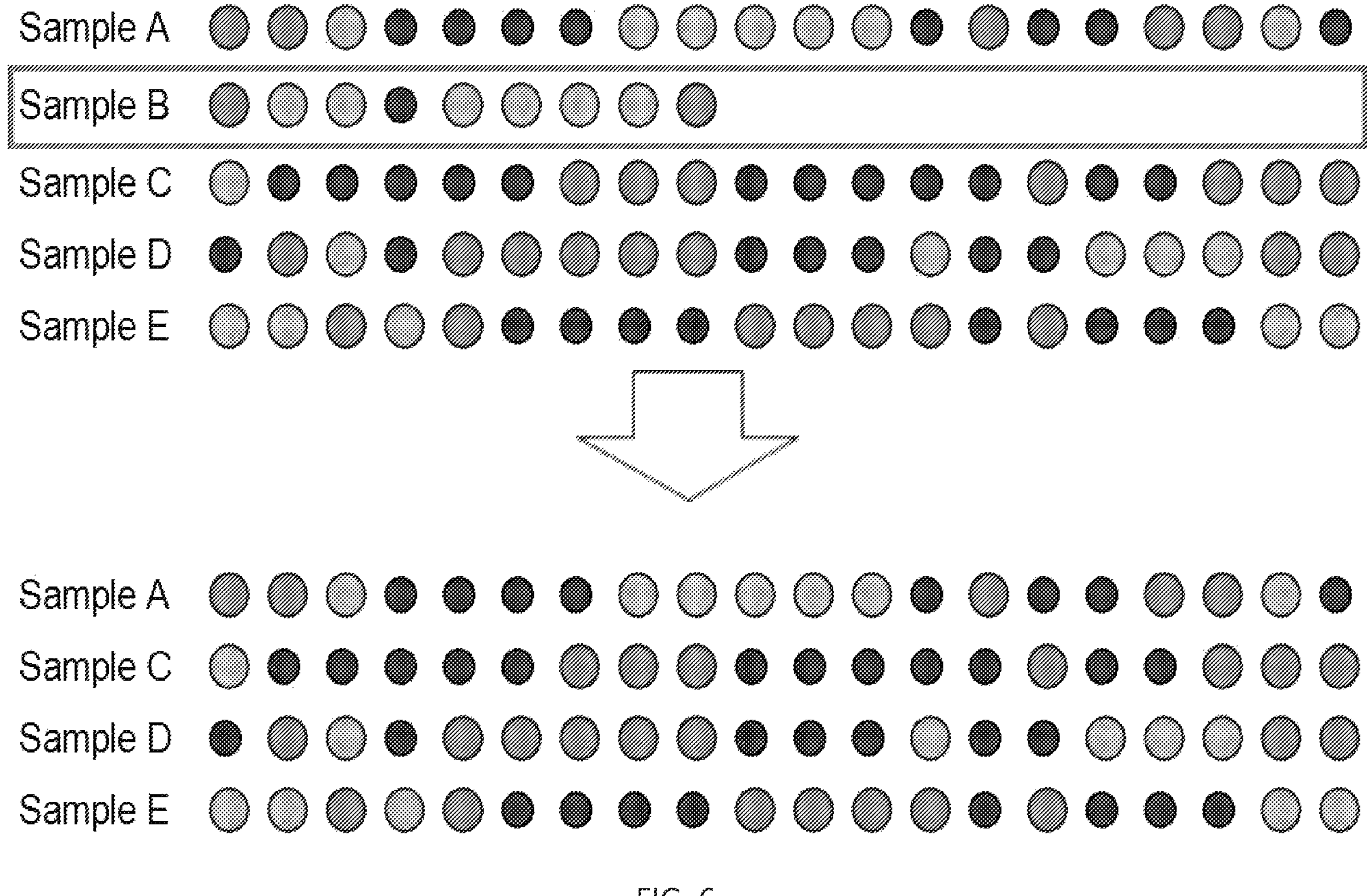
Figure 7:
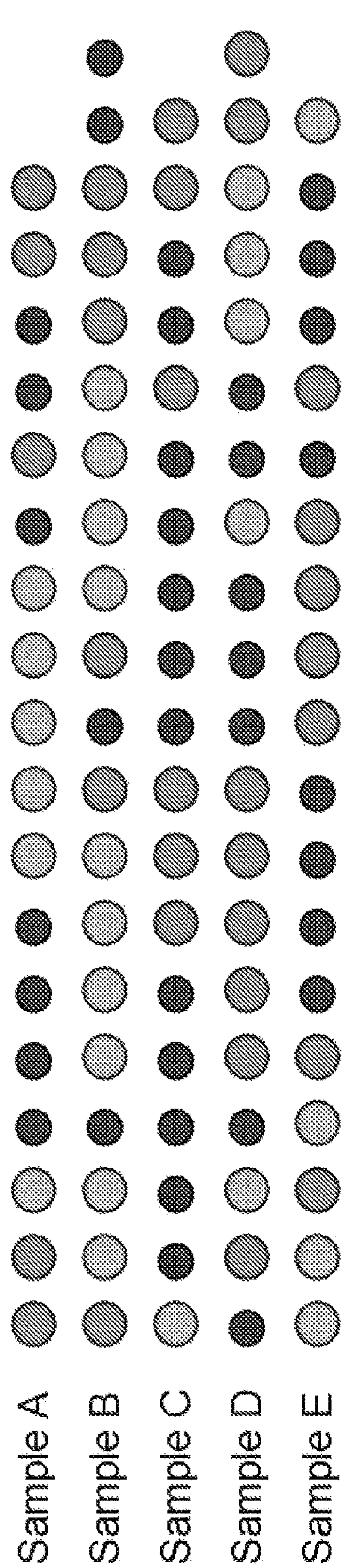
Figure 7:
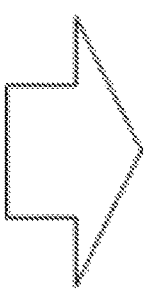
Figure 7:
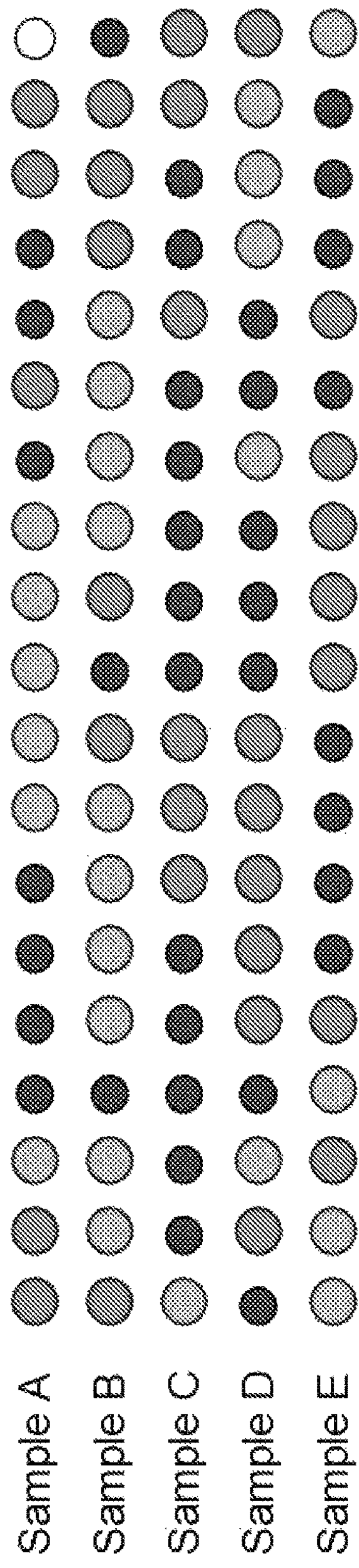
Figures 8, 9:
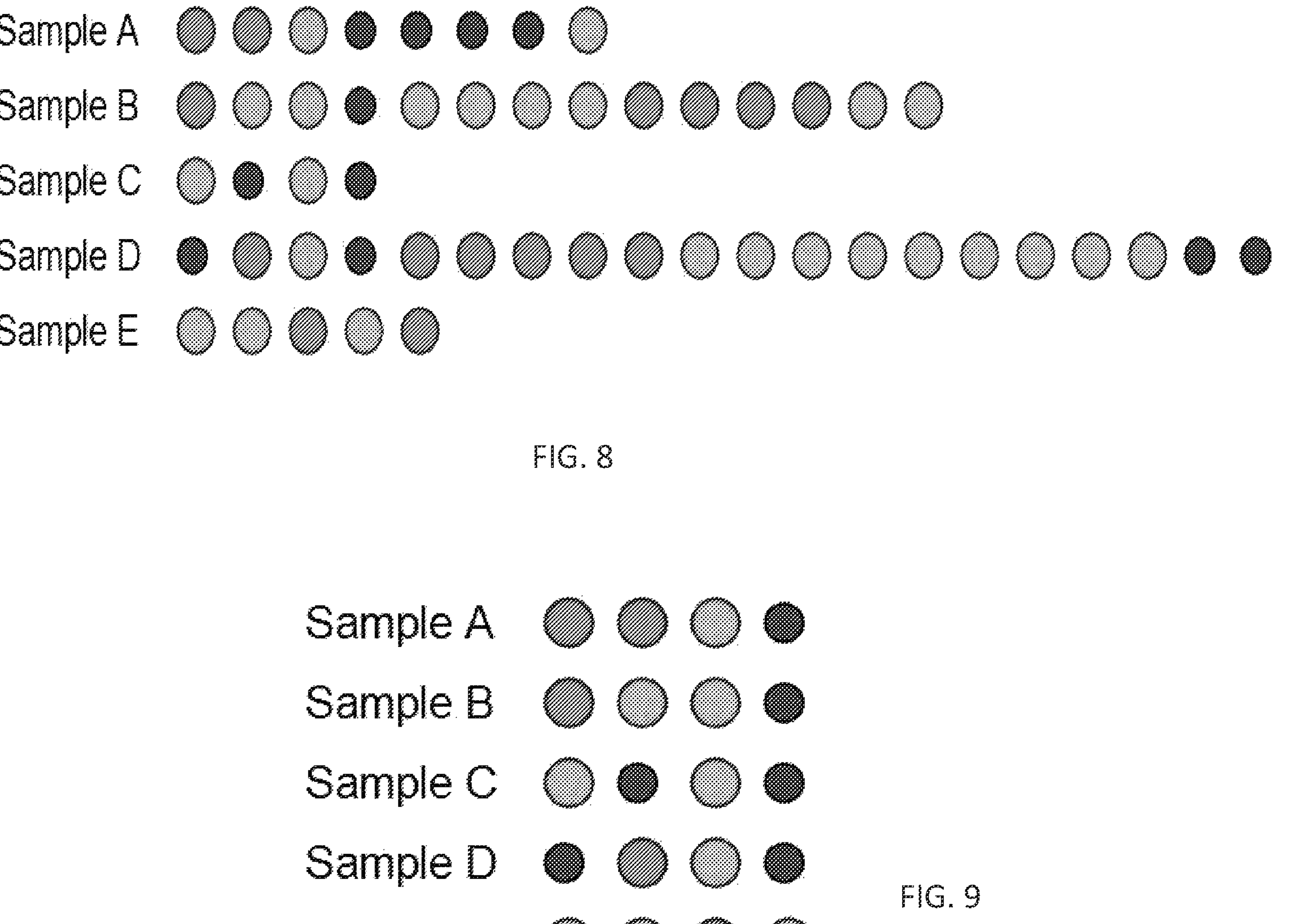
Figure 10:
Figure 11:
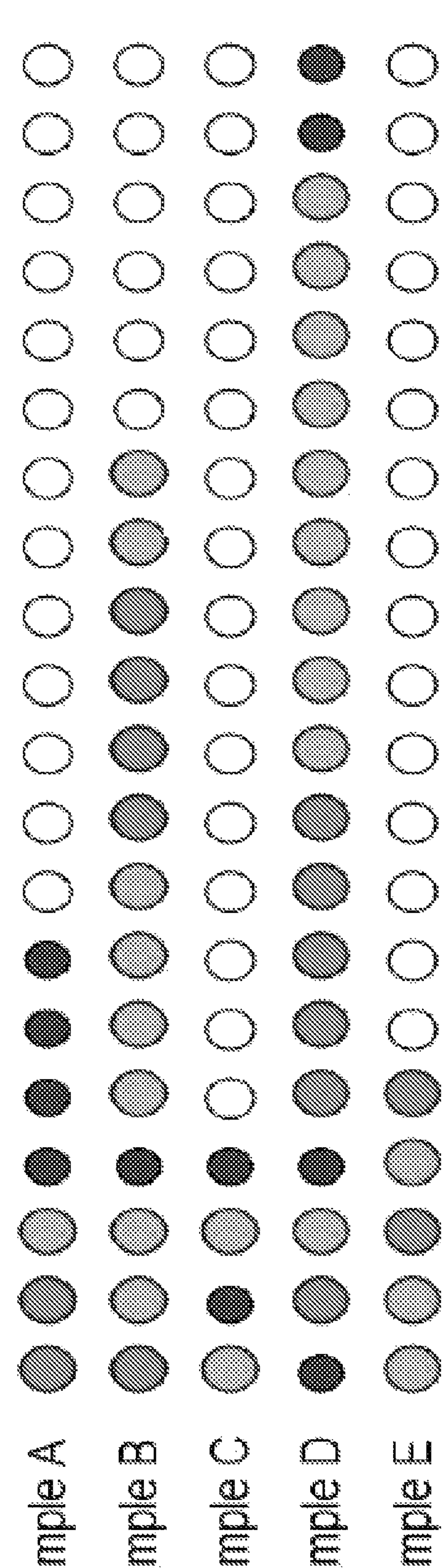

Broadly, this disclosure enables various computing technologies for various data science techniques to preserve signal in data inputs with moderate to high levels of variances in data sequence lengths for artificial neural network model training. These data science techniques can address various technological concerns, as explained above, and can be helpful for dealing with time series or non-fixed-length time spans or other forms of discretized, parsed, or tokenized data. Some technological effects of utilizing these data science techniques can be technologically equivalent to getting more relevant training data, which can allow a model of a neural network (e.g., an RNN) to be trained to a high level of accuracy. Some of these data science techniques include a construction of a virtual batch, where at least some data samples are swapped in and out, and a technique of resetting a global state of a stateful RNN (or another ANN) that is sensitive to a state of the virtual batch in which only at least some state information relating to those swapped samples is reset in the virtual batch. For example, the technique for resetting the global state can reset various internal states relevant to new virtual data segments for various components of the stateful RNN (or another ANN).

This disclosure is now described more fully with reference to FIGS. 1-35, in which some embodiments of this disclosure are shown. This disclosure may, however, be embodied in many different forms and should not be construed as necessarily being limited to only embodiments disclosed herein. Rather, these embodiments are provided so that this disclosure is thorough and complete, and fully conveys various concepts of this disclosure to skilled artisans.

Note that various terminology used herein can imply direct or indirect, full or partial, temporary or permanent, action or inaction. For example, when an element is referred to as being "on," "connected" or "coupled" to another element, then the element can be directly on, connected or coupled to the other element or intervening elements can be present, including indirect or direct variants. In contrast, when an element is referred to as being "directly connected" or "directly coupled" to another element, there are no intervening elements present.

Likewise, as used herein, a term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

Similarly, as used herein, various singular forms "a," "an" and "the" are intended to include various plural forms as well, unless context clearly indicates otherwise. For example, a term "a" or "an" shall mean "one or more," even though a phrase "one or more" is also used herein. For example, "one or more" includes one, two, three, four, five, six, seven, eight, nine, ten, tens, hundreds, thousands, or more including all intermediary whole or decimal values therebetween.

Moreover, terms "comprises," "includes" or "comprising," "including" when used in this specification, specify a presence of stated features, integers, steps, operations, elements, or components, but do not preclude a presence and/or addition of one or more other features, integers, steps, operations, elements, components, or groups thereof. Furthermore, when this disclosure states that something is "based on" something else, then such statement refers to a basis which may be based on one or more other things as well. In other words, unless expressly indicated otherwise, as used herein "based on" inclusively means "based at least in part on" or "based at least partially on."

Additionally, although terms first, second, and others can be used herein to describe various elements, components, regions, layers, or sections, these elements, components, regions, layers, or sections should not necessarily be limited by such terms. Rather, these terms are used to distinguish one element, component, region, layer, or section from another element, component, region, layer, or section. As such, a first element, component, region, layer, or section discussed below could be termed a second element, component, region, layer, or section without departing from this disclosure.

Also, unless otherwise defined, all terms (including technical and scientific terms) used herein have the same meaning as commonly understood by one of ordinary skill in an art to which this disclosure belongs. As such, terms, such as those defined in commonly used dictionaries, should be interpreted as having a meaning that is consistent with their meaning in a context of a relevant art and should not be interpreted in an idealized or overly formal sense unless expressly so defined herein.

Hereby, all issued patents, published patent applications, and non-patent publications (including hyperlinked articles, web pages, and websites) that are mentioned in this disclosure are herein incorporated by reference in their entirety for all purposes, to same extent as if each individual issued patent, published patent application, or non-patent publication were copied and pasted herein or specifically and individually indicated to be incorporated by reference. If any disclosures are incorporated herein by reference and such disclosures conflict in part and/or in whole with the present disclosure, then to the extent of conflict, and/or broader disclosure, and/or broader definition of terms, the present disclosure controls. If such disclosures conflict in part and/or in whole with one another, then to the extent of conflict, the later-dated disclosure controls.

Figure 12:
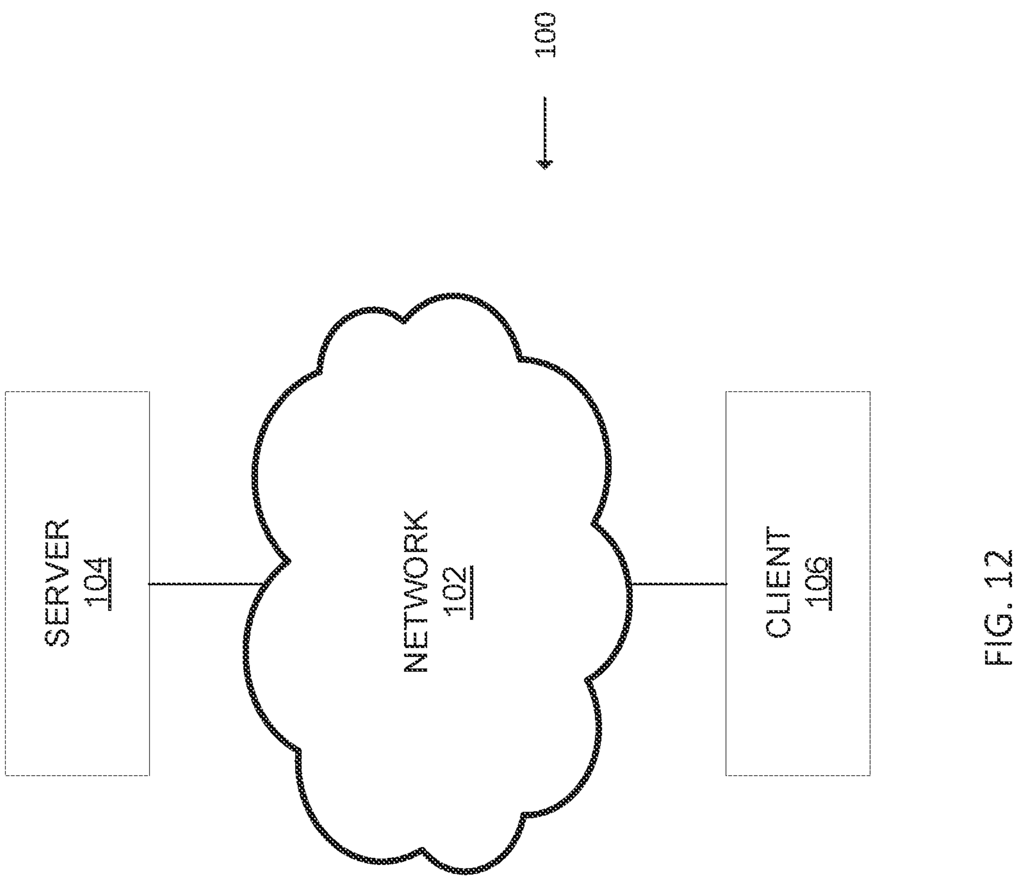
FIG. 12 is a diagram of an embodiment of a system for preserving signals in data inputs with moderate to high levels of variances in data sequence lengths for artificial neural network model training according to this disclosure.

FIG. 12 is a diagram of an embodiment of a system for preserving signals in data inputs with moderate to high levels of variances in data sequence lengths for artificial neural network model training according to this disclosure. In particular, a system 100 includes a network 102, a server 104, and a client 106. The server 104 and the client 106 are communication (e.g., wired, wireless, waveguide) with each other over the network 102.

The network 102 includes a plurality of computing nodes interconnected via a plurality of communication channels, which allow for sharing of resources, applications, services, files, streams, records, information, or others. The network 102 can operate via a network protocol, such as an Ethernet protocol, a Transmission Control Protocol (TCP)/Internet Protocol (IP), or others. The network 102 can have any scale, such as a personal area network (PAN), a local area network (LAN), a home area network, a storage area network (SAN), a campus area network, a backbone network, a metropolitan area network, a wide area network (WAN), an enterprise private network, a virtual private network (VPN), a virtual network, a satellite network, a computer cloud network, an internetwork, a cellular network, or others. The network 102 can include an intranet, an extranet, or others. The network 102 can include Internet. The network 102 can include other networks or allow for communication with other networks, whether sub-networks or distinct networks.

The server 104 can include a web server, an application server, a database server, a virtual server, a physical server, or others. For example, the server 104 can be included within a computing platform (e.g., Amazon Web Services, Microsoft Azure, Google Cloud, IBM cloud) having a cloud computing environment defined via a plurality of servers including the server 104, where the servers operate in concert, such as via a cluster of servers, a grid of servers, a group of servers, or others, to perform a computing task, such as reading data, writing data, deleting data, collecting data, sorting data, or others. For example, the server 104 or the servers including the server 104 can be configured for parallel processing (e.g., multicore processors). The computing platform can include a mainframe, a supercomputer, or others. The servers can be housed in a data center, a server farm or others. The computing platform can provide a plurality of computing services on-demand, such as an infrastructure as a service (IaaS), a platform as a service (PaaS), a packaged software as a service (SaaS), or others. For example, the computing platform can providing computing services from a plurality of data centers spread across a plurality of availability zones (AZs) in various global regions, where an AZ is a location that contains a plurality of data centers, while a region is a collection of AZs in a geographic proximity connected by a low-latency network link. For example, the computing platform can enable a launch of a plurality of virtual machines (VMs) and replicate data in different AZs to achieve a highly reliable infrastructure that is resistant to failures of individual servers or an entire data center.

The client 106 includes a logic that is in communication with the server 104 over the network 102. When the logic is hardware-based, then the client 106 can include a desktop, a laptop, a tablet, or others. For example, when the logic is hardware-based, then the client can include an input device, such as a cursor device, a hardware or virtual keyboard, or others. Likewise, when the logic is hardware-based, then the client 106 can include an output device, such as a display, a speaker, or others. Note that the input device and the output device can be embodied in one unit (e.g., touchscreen). When the logic is software-based, then the client 106 can include a software application, a browser, a software module, an executable or data file, a mobile app, or others. Regardless of how the logic is implemented, the logic enables the client 106 to communicate with the server 104, such as to request or to receive a resource/service from the computing platform via a common framework, such as a hypertext transfer protocol (HTTP), a HTTP secure (HTTPS) protocol, a file transfer protocol (FTP), or others.

FIGS. 13-32 show various embodiments of various computational techniques for construction of virtual batches according to this disclosure. These techniques enable preserving signals in data inputs with moderate to high levels of variances in data sequence lengths for artificial neural network model training. In particular, these data science techniques are performed by the server 104 as being requested over the network 102 by a user (e.g., data scientist) operating the client 106. The data science techniques can address various technological concerns, as explained above, and can be helpful for dealing with time series or non-fixed-length time spans or other forms of discretized, parsed, or tokenized data. Some technological effects of utilizing these data science techniques can be technologically equivalent to getting more relevant training data, which can allow a model of a neural network (e.g., an RNN) to be trained to a high level of accuracy. Some of these data science techniques include a construction of a virtual batch, where data samples are swapped in and out, and a technique of resetting a global state of a stateful RNN (or another ANN) that is sensitive to a state of the virtual batch in which only at least some state information relating to those swapped samples is reset in the virtual batch. For example, the technique for resetting the global state can reset various internal states relevant to new virtual data segments for various components of the stateful RNN (or another ANN).

Processing some specific generic data in batches is described in Stepp, Robert E. "Machine learning from structured objects." Proceedings of the Fourth International Workshop on Machine Learning. Morgan Kaufmann, 1987, which is incorporated by reference herein for all purposes. As such, this disclosure deviates from this conventional practice by forming a virtual batch, as described herein. The virtual batch can be formed in various ways. One way that the virtual batch can be formed is by combining multiple samples of data together into a plurality of batches of virtual samples in order to reduce an overall variance in data, without adversely affecting at least some training or inference performance of the RNN. Note that although this disclosure is described in context of the RNN, which can be stateful, other types or sub-types of the ANN can be used. Some of such types or sub-types can include a long short-term memory (LSTM), a convolutional neural network (CNN), a convolutional LSTM, a gated recurrent unit (GRU), or others.

Constructing a batch involves having various individual values of data (represented as individual circles of varying color) belonging to each data sample (represented as rows) are read by various machine learning models in batches in order to maximize at least some utilization of a processing hardware device via computational parallelized processing (e.g., on core basis, on thread basis). For example, the processing hardware device can include a central processing unit (CPU), a graphics processing unit (GPU), a tensor processing unit (TPU), or others, which can be configured for parallel processing (e.g., on core basis, on thread basis). For example, at least some device parallelization (e.g., spreading or distributing model architecture across physical devices) or at least some data parallelization (e.g., splitting or distributing data across physical devices) can be applicable. For example, at least some device parallelization or at least some data parallelization can include processing (e.g., reading, modifying, moving, sorting, organizing) of each data sample in a batch, a virtual batch, a data column, or a dataset in parallel simultaneously by multiple cores of the processing hardware device (e.g., CPU, GPU, TPU).

Figure 13:
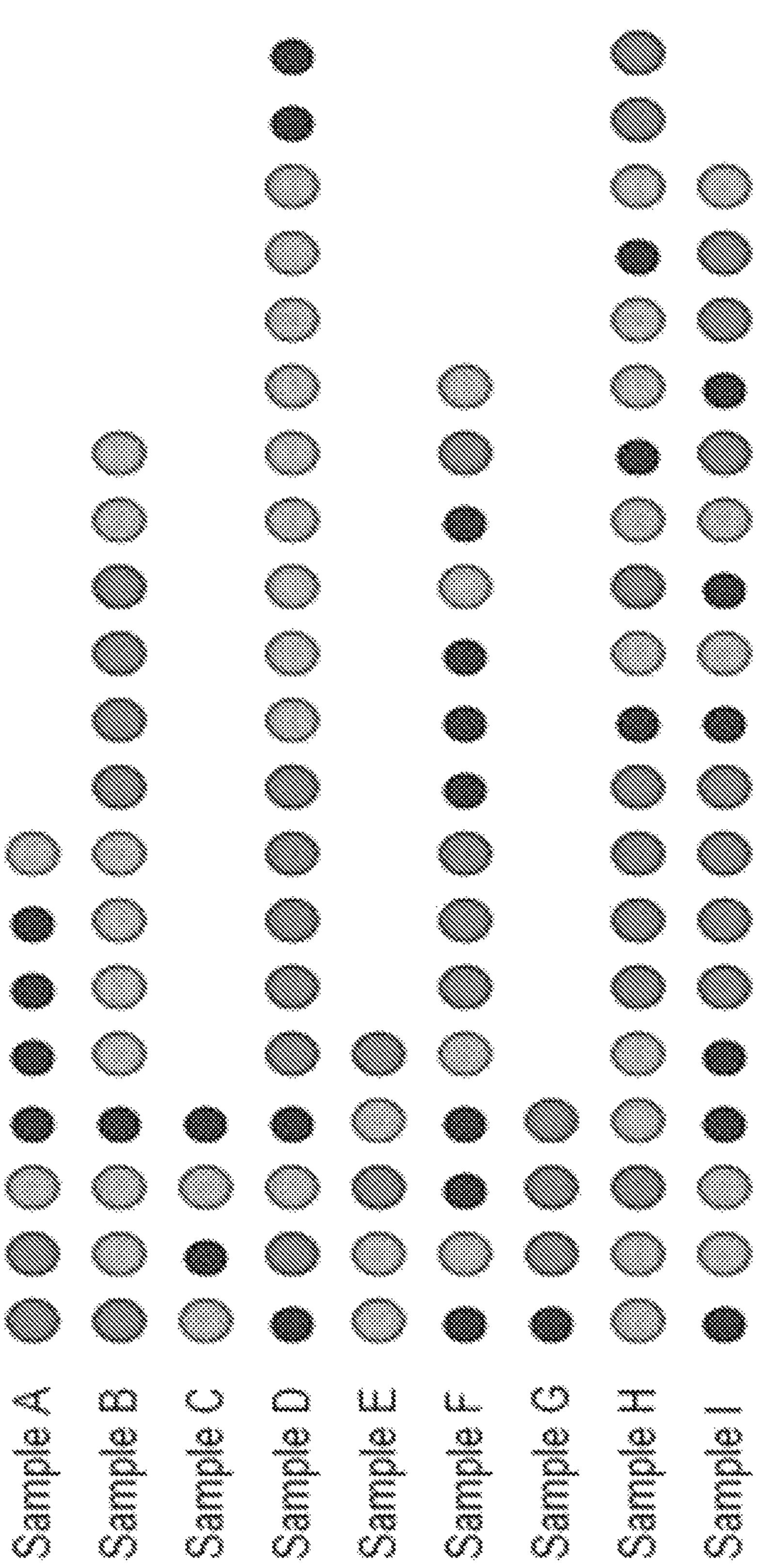
FIGS. 13-32 show various embodiments of various computational techniques for construction of virtual batches according to this disclosure.

As shown in FIG. 13, a batch includes an organizational unit of data or a dataset having a grid of a plurality of cells defined via a plurality of rows and a plurality of columns that logically intersect each other (e.g., a data structure, an array). For example, the batch can be accessed (e.g., being granted access, read, modified, opened, retrieved, fed, inserted) for subsequent processing. The rows correspond to a plurality of data samples. The columns can be any number, as set by the user of the client 106. The cells are populated with a plurality of data values (circles). The data values can correspond to a word, a single voltage reading for a moment in time, a single point-in-time price of a financial security, a weather forecast, an exchange rate, a set of sales values, a set of sound waves, or other data. For example, the data samples can contain the data values that are collected over time from a plurality of electrical leads (e.g., EEG leads) attached to a plurality of people or a plurality of thermometers measuring a plurality of environments or people or a plurality of data channels of an electrical signal. For example, the data values can be a plurality of temperature readings obtained from a plurality of indoor or outdoor environments or people. Note that data can include alphanumeric data, pixel data, or other data types.

Figure 14:
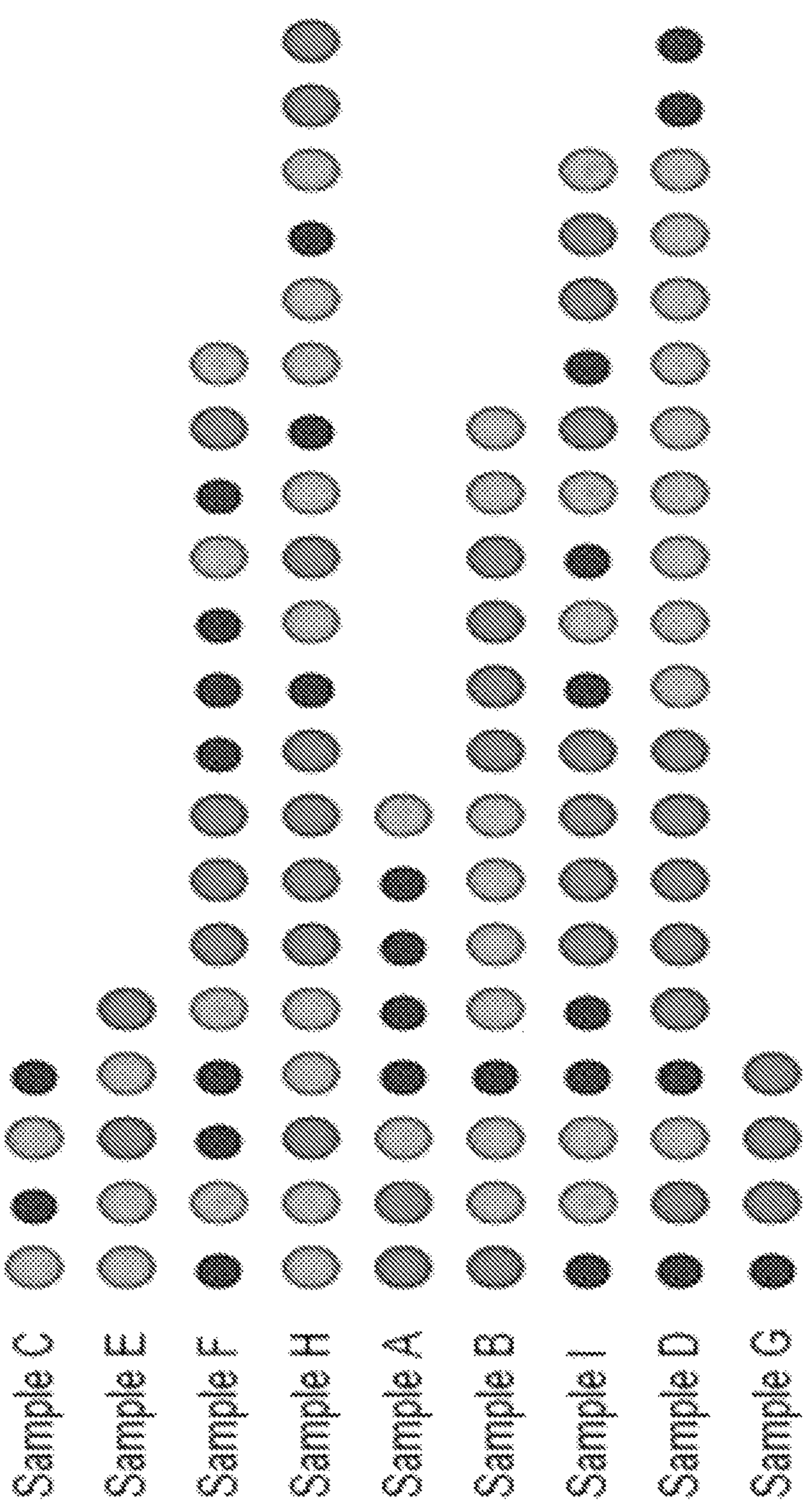

As shown in FIG. 14, before batch construction begins, various samples of data are randomly ordered in order to provide a diversity of updates to a model of the RNN while the model of the RNN is being trained. Note that the samples of data are randomly shuffled relative to the batch of FIG. 13 and the samples of data have been reordered. One way of such random ordering can be via a random function.

The batch can be constructed while using various parameters. Some of such parameters include a window size and a batch size, which can be values specified by the user of the client 106.

The window size can be any positive whole number greater than 0 (e.g., 6, 13, 235). The window size is a number of individual sequential data values that the RNN expects to receive as input. For example, if the RNN is being designed to predict temperature, then, by design, the RNN may, as designed, mandate that previous 10 temperature readings be provided as input to the model of the RNN. For simplicity, the window size is set to 4, but can be any positive whole number greater than 0.

The batch size can be any positive whole number greater than zero (e.g., 6, 13, 235). The batch size is a number of samples of data to be included in each batch. A theoretical maximum batch size is a maximum number of data points in a sample, but in practice is limited by an amount of memory on the processing hardware device. For simplicity, the batch size is set to 3, but can be any positive whole number greater than 0.

Figure 15:
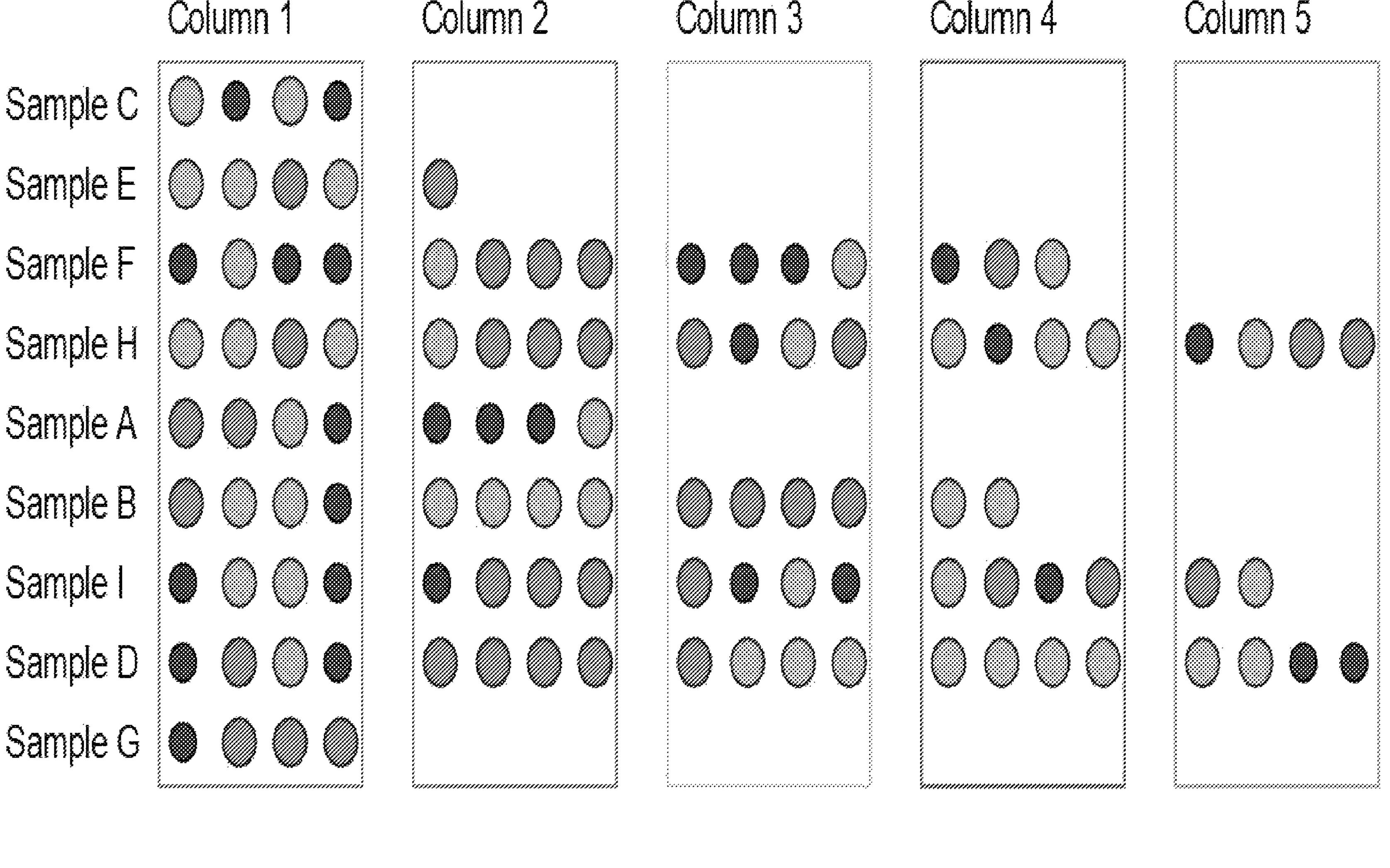

As shown in FIG. 15, the batch can be constructed by segmenting the samples of data into data columns (or windows) of four values each (window size). This action retains a sequential order in which that data was provided, as previously randomized. As such, a set of 4×9 data columns is formed. The set of data columns now includes 5 data columns.

Figure 16:
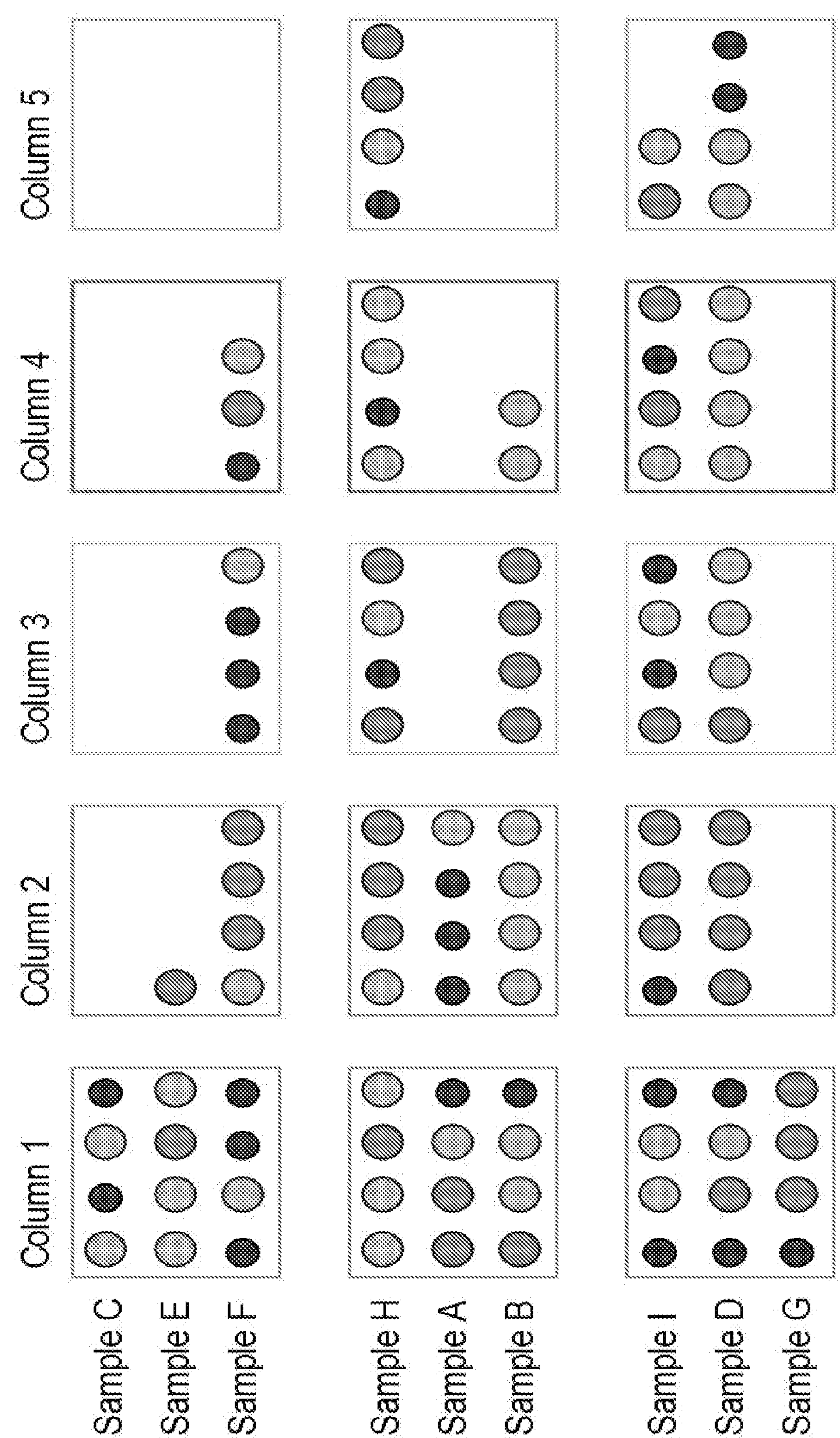

As shown in FIG. 16, the set of 4×9 data columns is segmented into a set of batches of sequential rows, with each of the batches having three data samples (batch size). This action retains a sequential order that resulted from randomization that occurs before every epoch, as described above. The set of batches now includes 15 batches.

Figure 17:
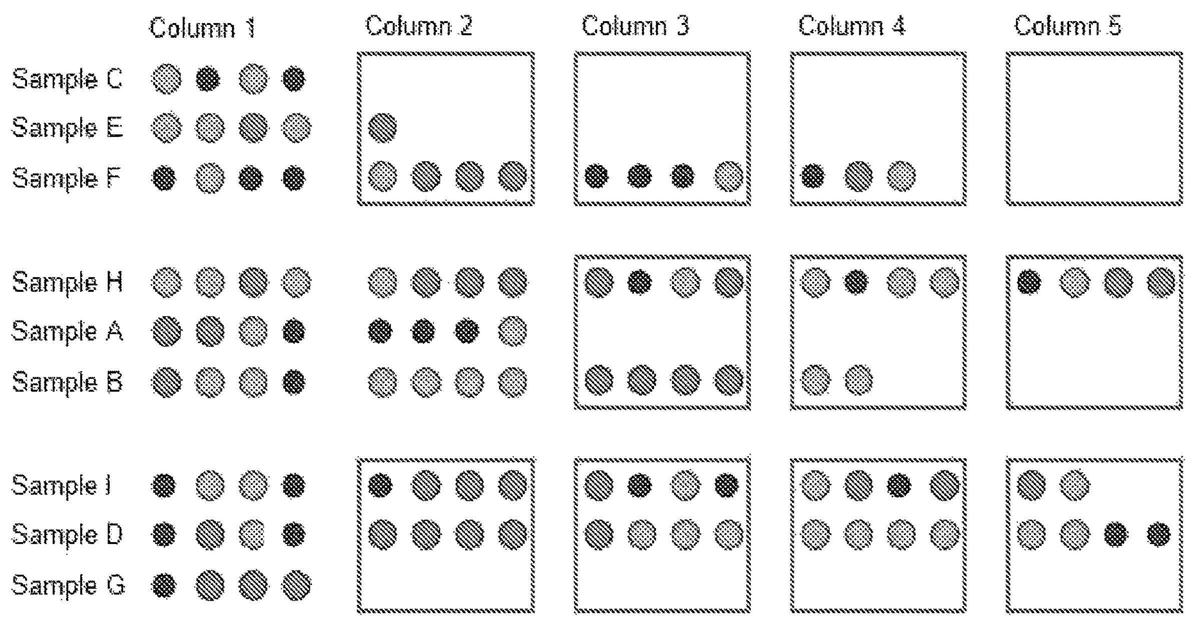
Figure 17:
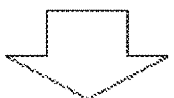
Figure 17:
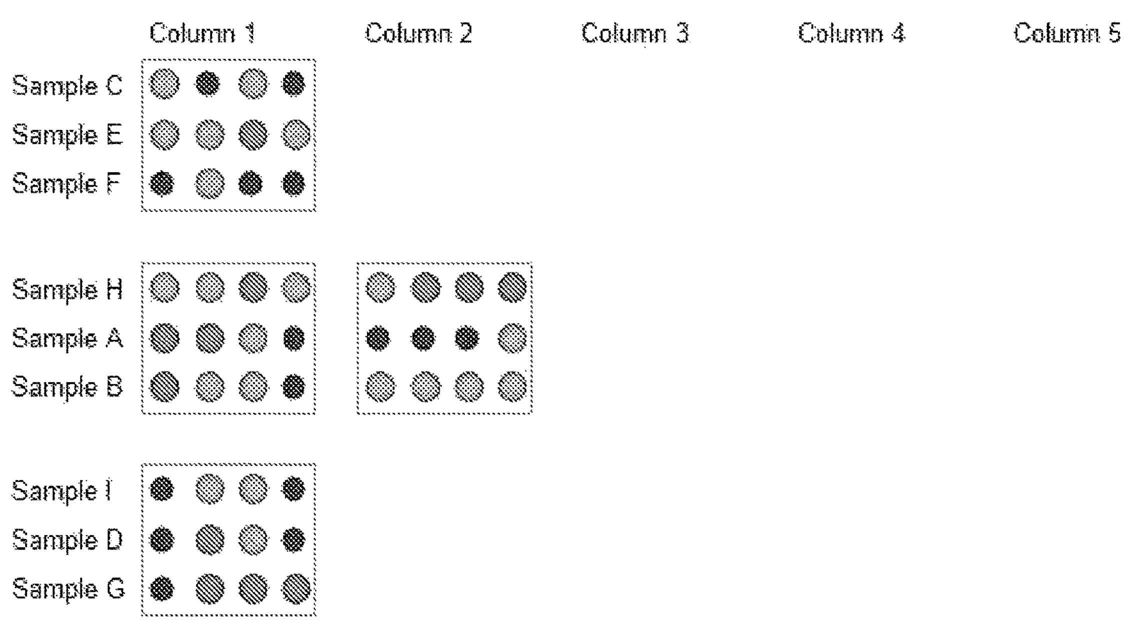

As shown in FIG. 17, the batches that have any missing data or are incomplete can be removed. This removal can occur for various reasons. First, when the RNN is stateful, then various states within each of the batches should be propagated forward to future batches. For example, a data sample in a second data column should know various states of a data sample in a first data column. Therefore, in some situations, when training the RNN that is stateful, the batch size is generally a fixed value and cannot be changed. Second, since the window size can define a number of individual sequential data values that the RNN expects to receive as input, the RNN may input data that violates this window size. Therefore, in some situations, any batches that include any data sample lengths less than the window size cannot be processed by the RNN and can be discarded, as shown in various red bounding boxes enclosing the batches that are discarded.

Figure 18:
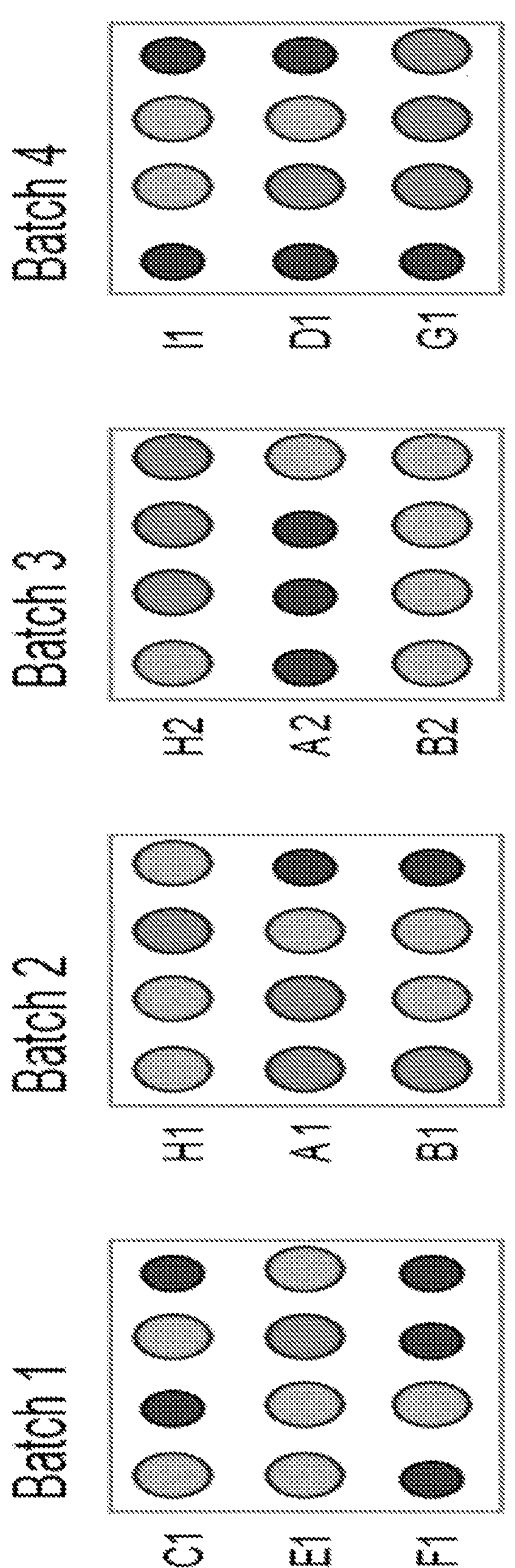
Figure 19:
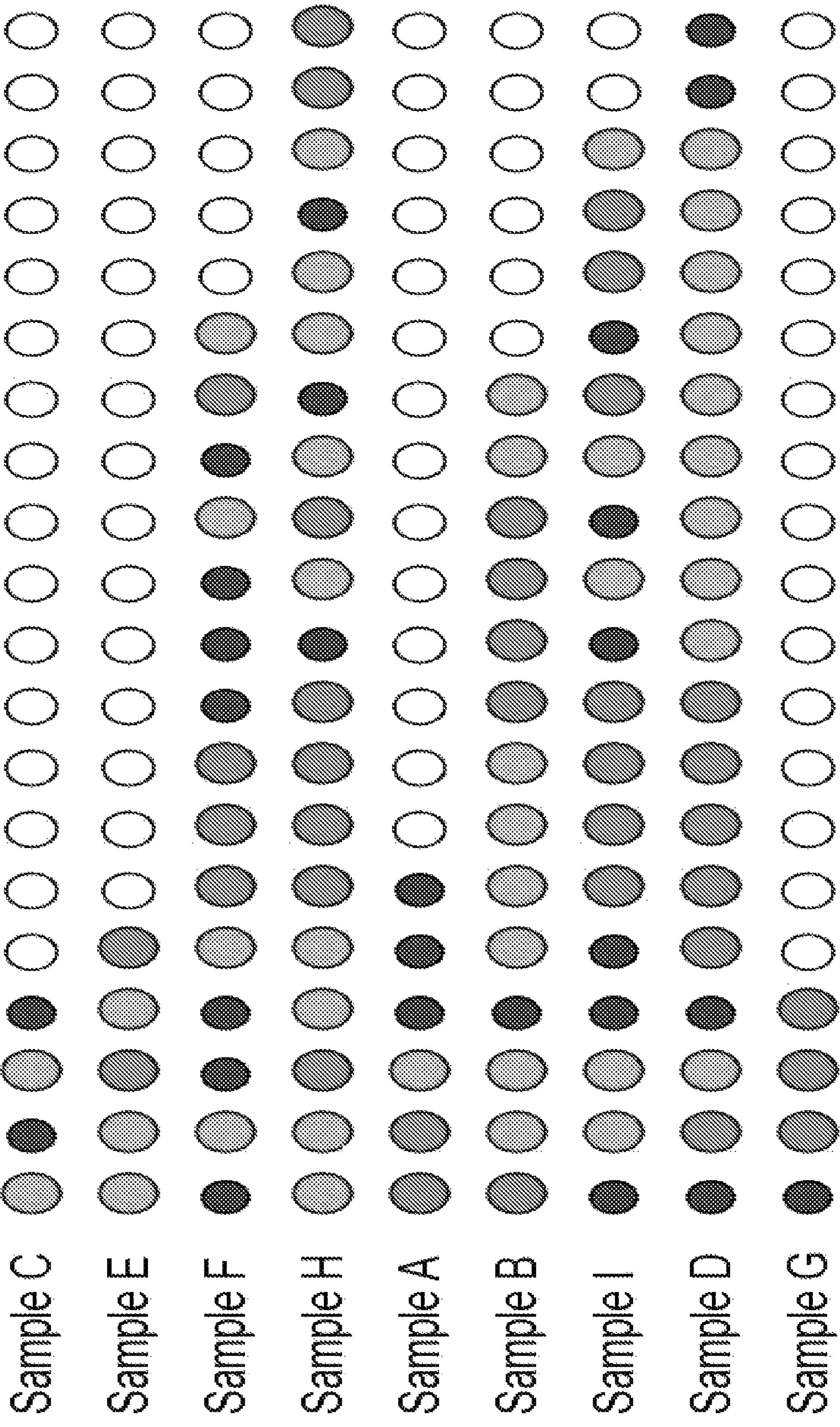

As shown in FIG. 18, a set of complete batches contains rows marked with a letter (A through I) and a number (1 through 5) corresponding to their source row and column, as shown in FIG. 17. Note that this technique of constructing batches without any variance mitigation strategies leaves 4 batches of 12 values each. As such, out of a set of original 108 data points, there are 48 data points (4 times 12) remaining. This shows a loss of data, which is technologically problematic.

Figure 20:
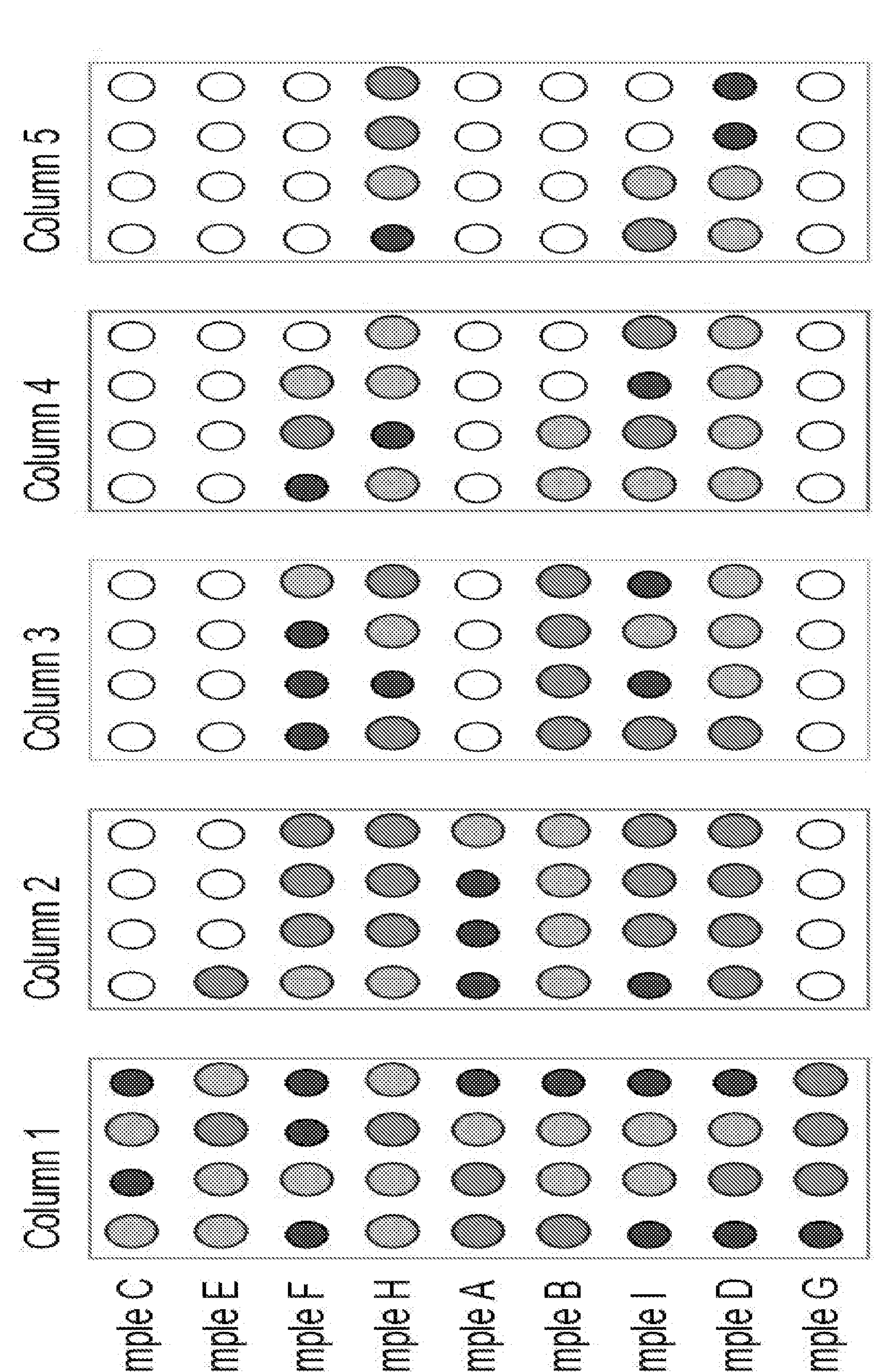
Figure 21:
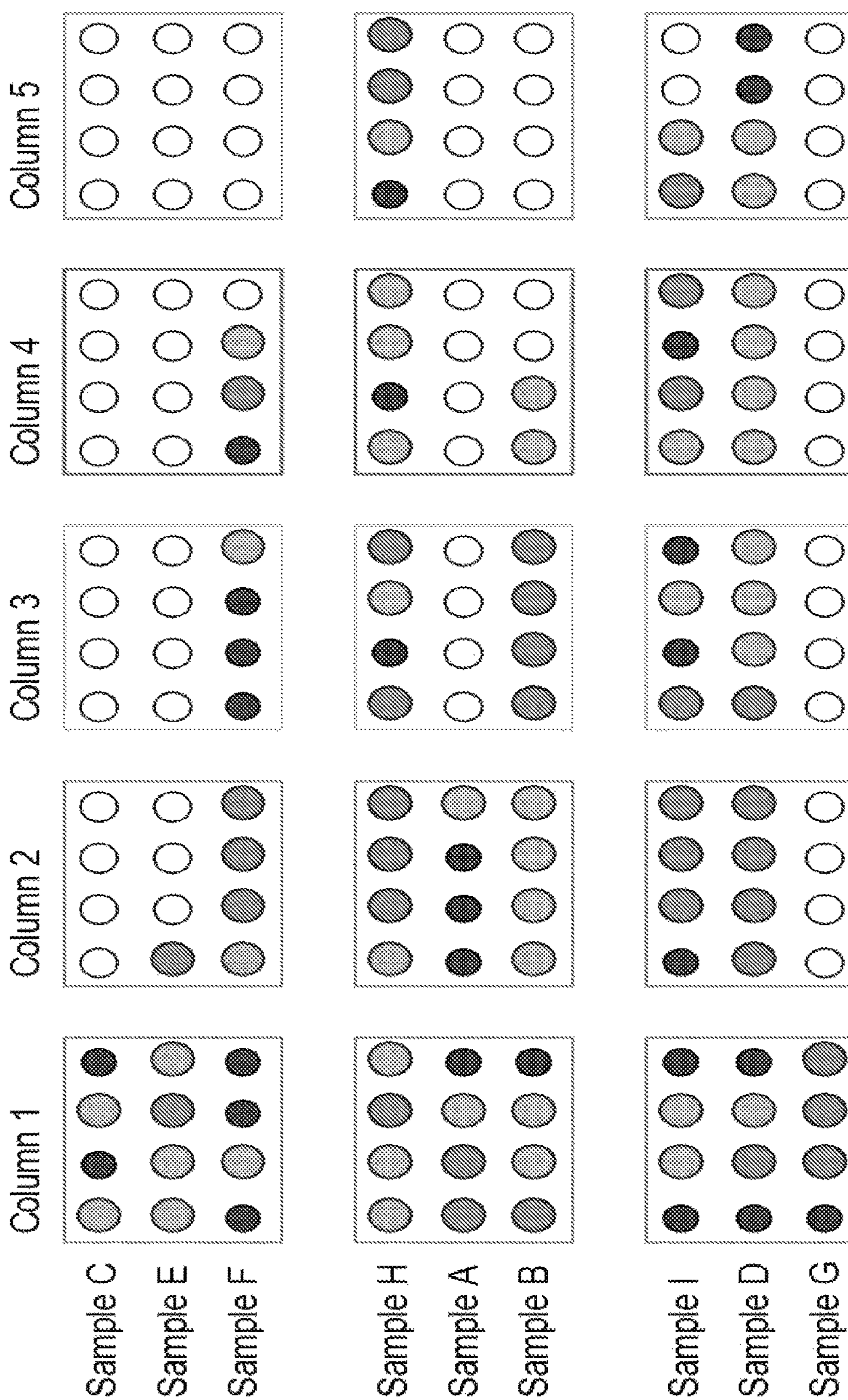

This approach of batch construction can be mitigated by padding. In particular, the batch of FIG. 14 is padded, thereby resulting in the batch of FIG. 19. Note that white circles correspond to padded data. As shown in FIG. 20, the batch is then segmented into data columns of 4 values to match the window size of 4. As shown in FIG. 21, the data columns are then segmented into a set of batches of sequential rows, with each of the batches having three data samples (batch size). This action retains a sequential order that resulted from randomization that occurs before every epoch, as described above. The set of batches now includes 15 batches. Note that method of mitigation by padding leaves 15 batches of 12 values each. As such, out of a set of original 108 data points, there are 180 data points (15 times 12). Although that appears as 60% more data, there has been a significant addition of, at best, low-quality data (padded data). Therefore, training the model of the RNN may be degraded in terms of speed of the RNN or learning ability of the RNN. Although some undefined behavior from such heavy padding may be mitigated with weighting, these weight updates may be more erratic in heavily padded data.

Figure 22:
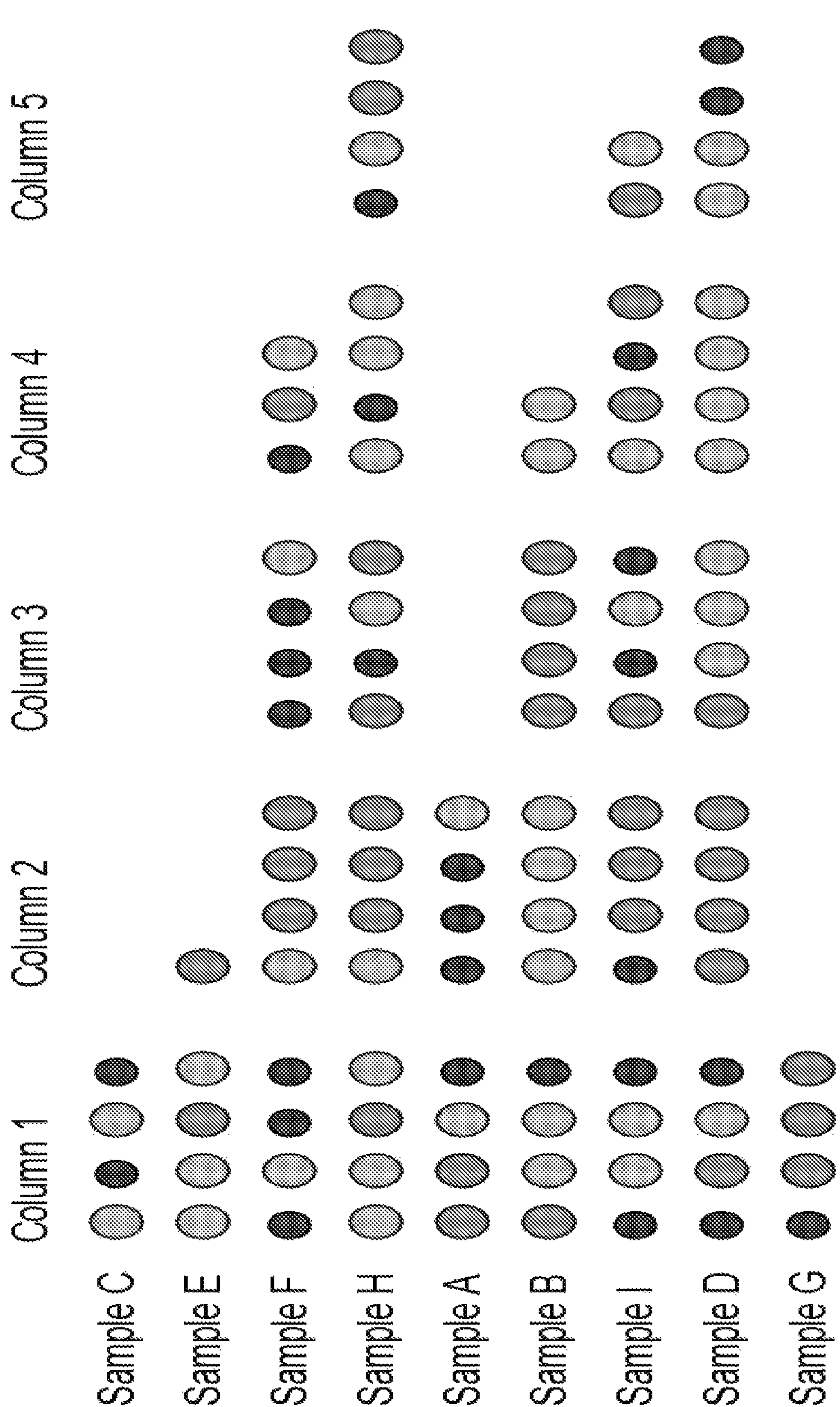
Figure 23:
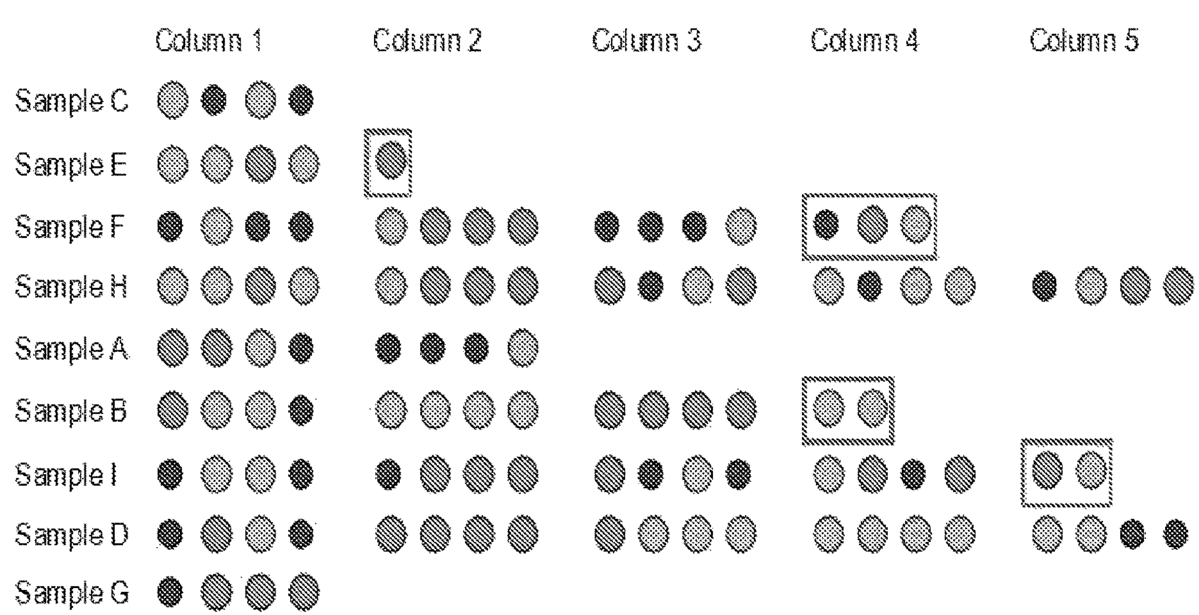
Figure 23:
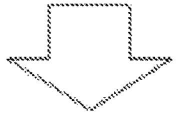

Accordingly, a technique of forming a virtual batch solves these technological problems. As shown in FIG. 22, the batch of FIG. 14 is segmented into data columns of 4 values to match the window size of 4. As shown in FIG. 23, any excess data that does not complete the window size is cropped out. Note that the window size corresponds to a number of individual sequential data values that the RNN expects to receive as input. The RNN may take in data that violates this window size. Therefore, within respective data columns, any data samples that do not complete the window size, as explained above, are discarded, as shown in various red bounding boxes enclosing those data samples.

Figure 24:
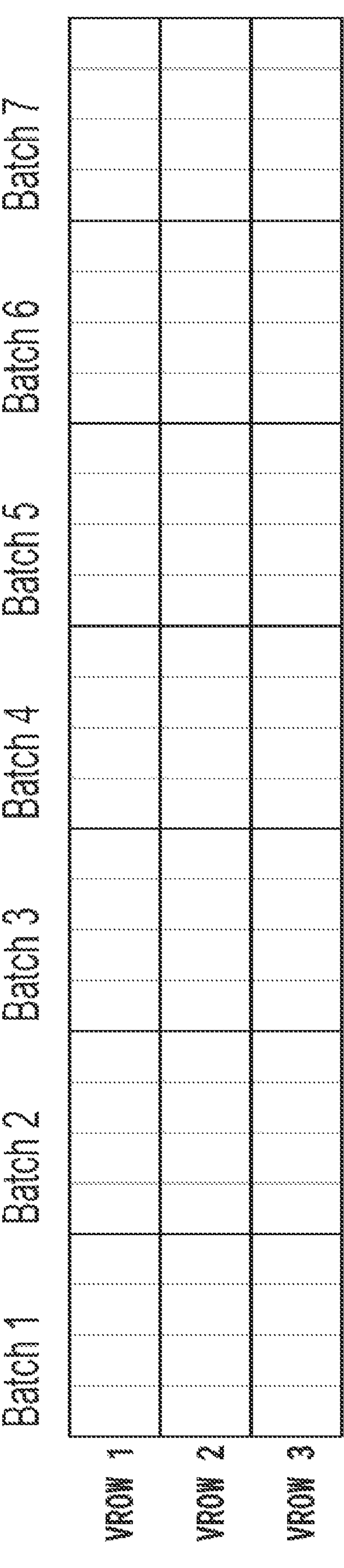

FIG. 24 shows a table (e.g., a data structure, an array) that functions as a source for constructing a plurality of virtual samples according to this disclosure. The table has a plurality of rows and a plurality of columns logically intersecting each other and thereby forming a plurality of cells that are populated with data values (e.g., whole or decimal numbers). Note that since the virtual samples should match the batch size, in this example, where the batch size is 3, a corresponding quantity of virtual samples will be constructed, i.e., 3. However, note that this is illustrative and lower or higher whole positive values greater than 0 for the batch size are possible (e.g., 1, 2, 4, 5, 6, 7, 8, 9, 10, 11 tens, hundreds, thousands, or more including any intermediary values).

Figure 25:
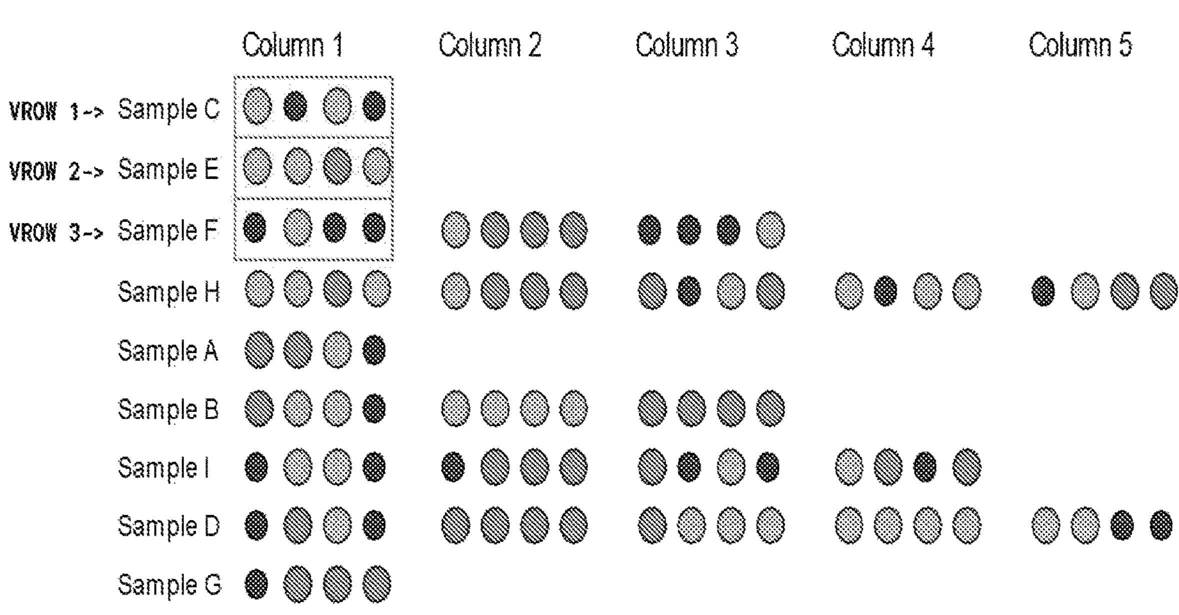
Figure 25:
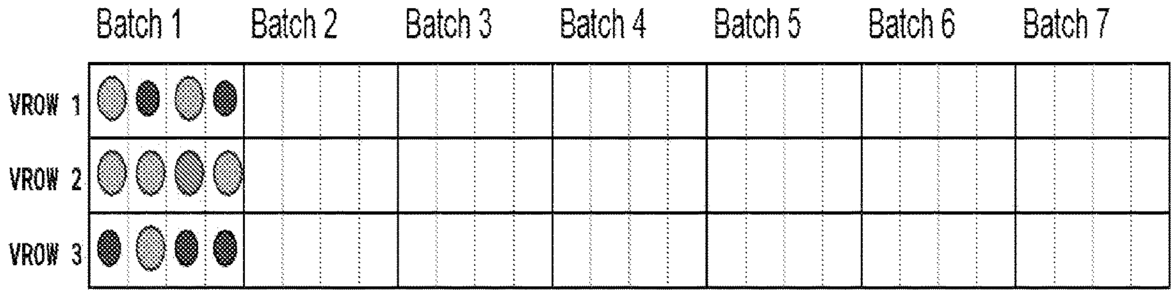

FIG. 25 shows a technique for constructing a first virtual batch according to this disclosure. In particular, the first virtual batch is constructed similarly to a regular batch. For example, the first virtual batch can be constructed by copying an amount of data corresponding to the window size from each of first three rows (from top) of a post-cropping data organization shown in FIG. 23, i.e., rows C, E, F to first three rows (from top) of the first virtual batch. As such, these actions result in the cells of the table of FIG. 24 being populated as shown in FIG. 25, where a plurality of alphabetic letters correspond to a plurality of data sample identifiers (e.g., C corresponds to Sample C).

Figure 26:
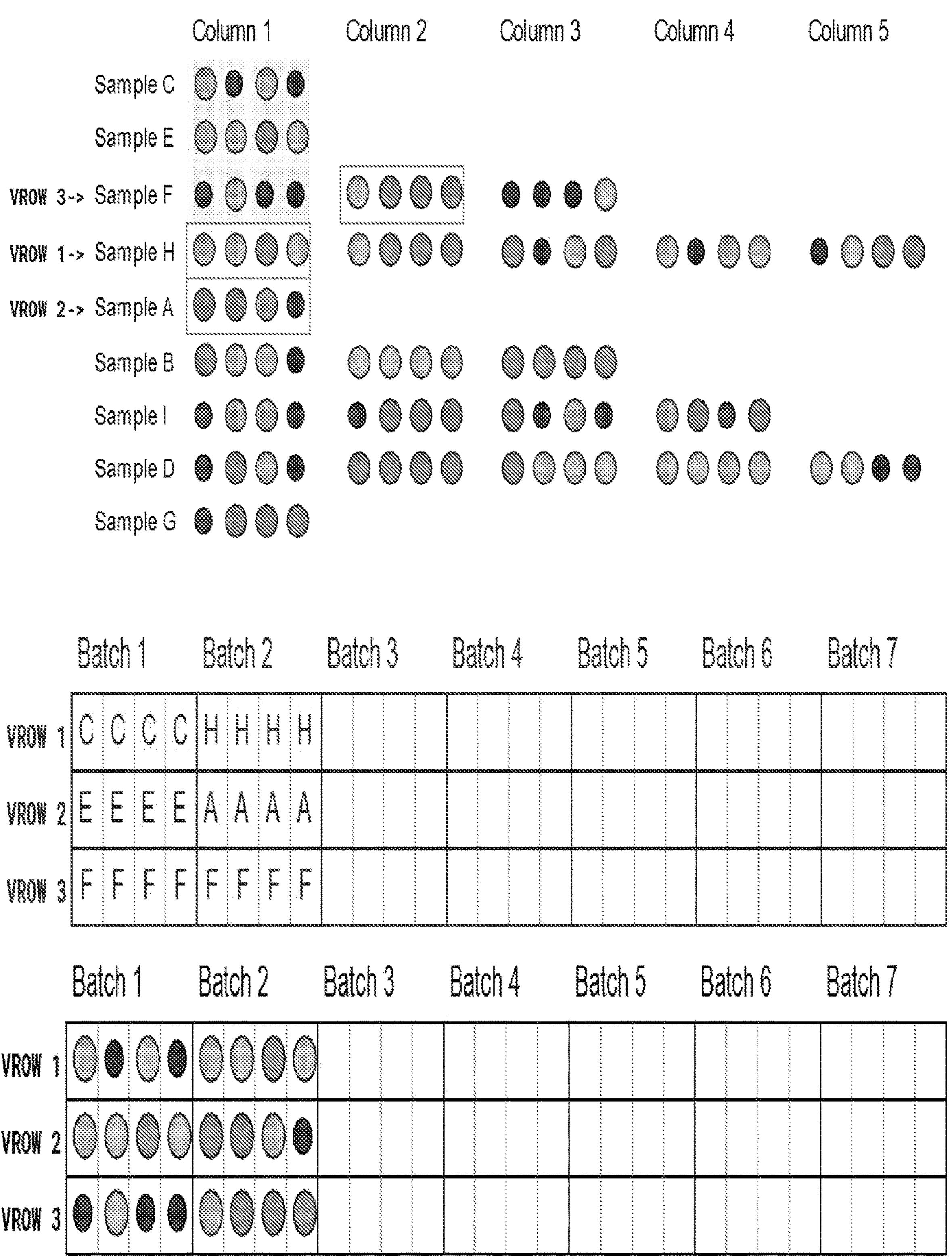
Figure 31:
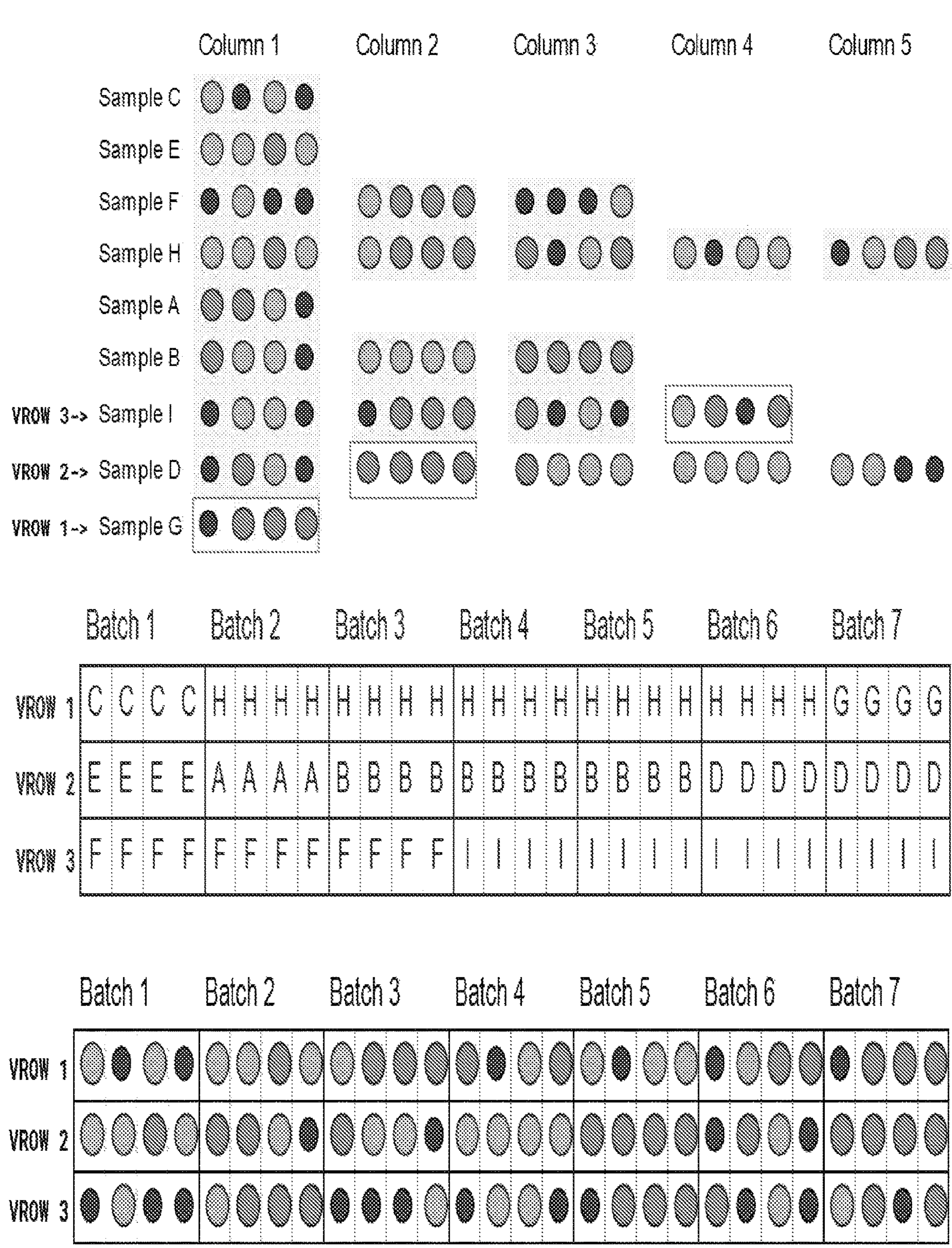

FIG. 26 shows a technique for constructing a second virtual batch according to this disclosure. In particular, how the second virtual batch (and other subsequent virtual batches) is constructed further evidences deviation from all currently known conventional techniques for batch construction for all model training for all types of ANN (e.g., an RNN, an LSTM, a CNN, a convolutional LSTM, a GRU). The technique may technologically improve at least some (a) eventual efficacy of an ANN being trained, (b) usage accuracy or precision of an ANN when the ANN is trained, (c) training process of an ANN, or (d) component of an ANN. As such, the technique for constructing the second virtual batch (and other subsequent virtual batches) includes various actions, as further described below. Note that the technique for constructing the second virtual batch (and other subsequent virtual batches) generally aims to maximize consecutive cell population in virtual batch rows of consecutive data values from same data samples (rows) per respective column when virtual batches are logically positioned adjacent to each other, as shown in FIG. 31. As such, this data arrangement effectively minimizes non-consecutive population or intermixing of data values from different data samples because otherwise doing so may effectively reduce model training accuracy. As further explained below, this can occur by computationally looking back at data values of previous rows in previous virtual batches.

For a first row of the second virtual batch, there is a check whether all data is exhausted in a row corresponding to Sample C (row C) horizontally across all data columns (data columns 2-5). Upon confirmation that all data is exhausted in row C horizontally across all data columns (data columns 2-5), since a next unused row within data column 1 is a row corresponding to Sample H (row H), there is copying of data from row H of data column 1 and insertion of that data, as copied, into the first row of the second virtual batch. Further, for a second row of the second virtual batch, there is a check whether all data is exhausted in a row corresponding to Sample E (row E) horizontally across all data columns (data columns 2-5). Upon confirmation that all data is exhausted in row E horizontally across all data columns (data columns 2-5), since a next unused row within data column 1 is a row corresponding to Sample A (row A), there is copying of data from row A of data column 1 and insertion of that data, as copied, into the second row of the second virtual batch. Further, for a third row of the second virtual batch, since row F, which is used in construction of the first virtual batch, still has more data to draw from, there is copying of data from row F of data column 2 and insertion of that data, as copied, into the third row of the virtual second batch.

Figure 27:
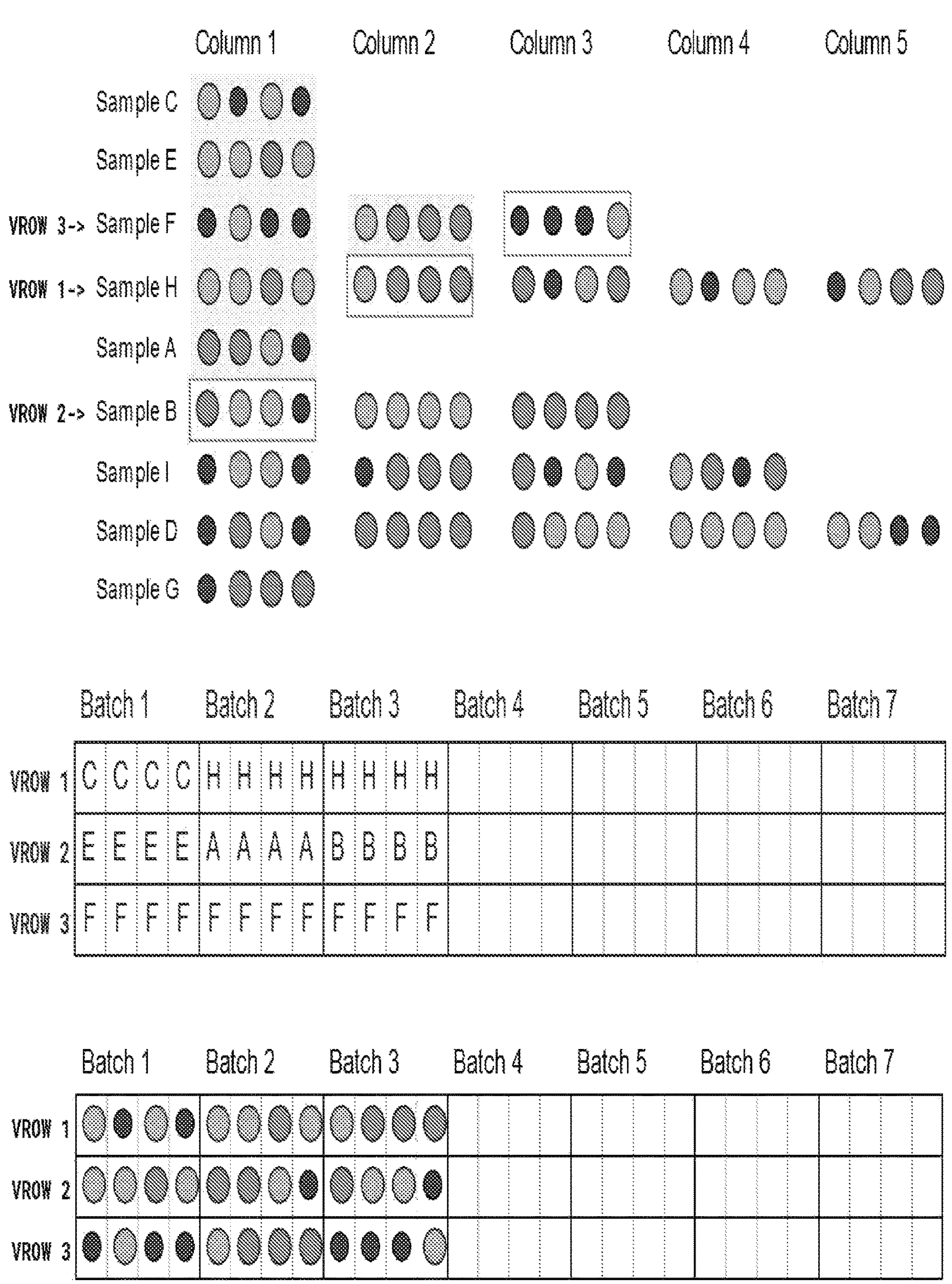

FIG. 27 shows a technique for constructing a third virtual batch according to this disclosure. In particular, for a first row of the third virtual batch, since row H, which is used in construction of the second virtual batch, still has more data to draw from, there is copying of data from row H of data column 2 and insertion of that data, as copied, into the first row of the third virtual batch. Further, for a second row of the third virtual batch, there is a check whether all data is exhausted in row A horizontally across all data columns (data columns 2-5). Upon confirmation that all data is exhausted in row A horizontally across all data columns (data columns 2-5), since a next unused row within data column 1 is a row corresponding to Sample B (row B), there is copying of data from row B of data column 1 and insertion of that data, as copied, into the second row of the third virtual batch. Further, for a third row of the third virtual batch, since row F, which is used in construction of the second virtual batch, still has more data to draw from, there is copying of data from row F of data column 3 and insertion of that data, as copied, into the third row of the third virtual batch.

Figure 28:
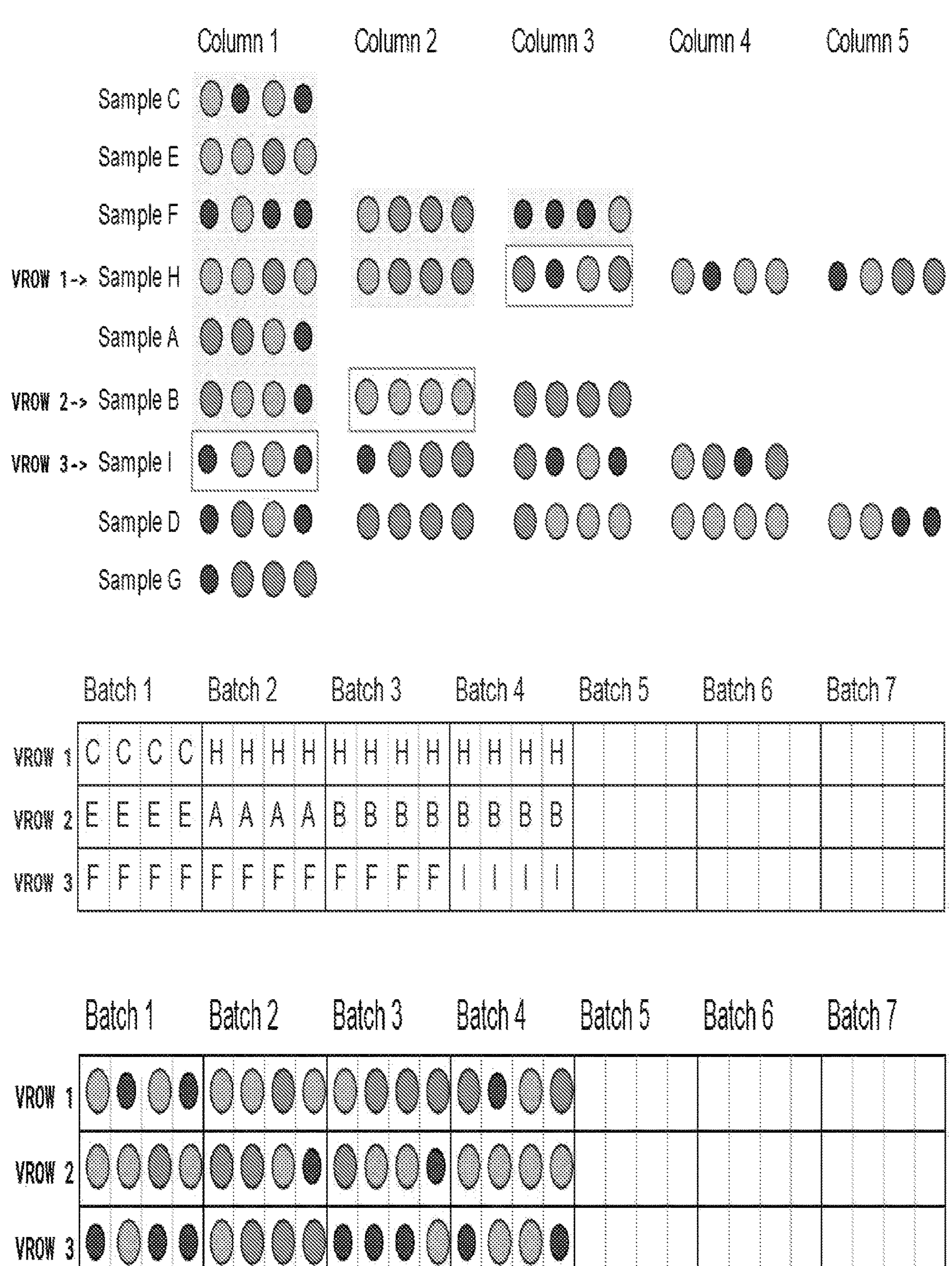

FIG. 28 shows a technique for constructing a fourth virtual batch according to this disclosure. In particular, for a first row of the fourth virtual batch, since row H, which is used in construction of the third virtual batch, still has more data to draw from, there is copying of data from row H of data column 3 and insertion of that data, as copied, into the first row of the fourth virtual batch. Further, for a second row of the fourth virtual batch, since row B, which is used in construction of the third virtual batch, still has more data to draw from, there is copying of data from row B of data column 2 and insertion of that data, as copied, into the second row of the fourth virtual batch. Further, for a third row of the fourth virtual batch, since data in row F is exhausted and a next unused row is a row corresponding to Sample I (row I), there is copying of data from row I of data column 1 and insertion of that data, as copied, into the third row of the fourth virtual batch.

Figure 29:
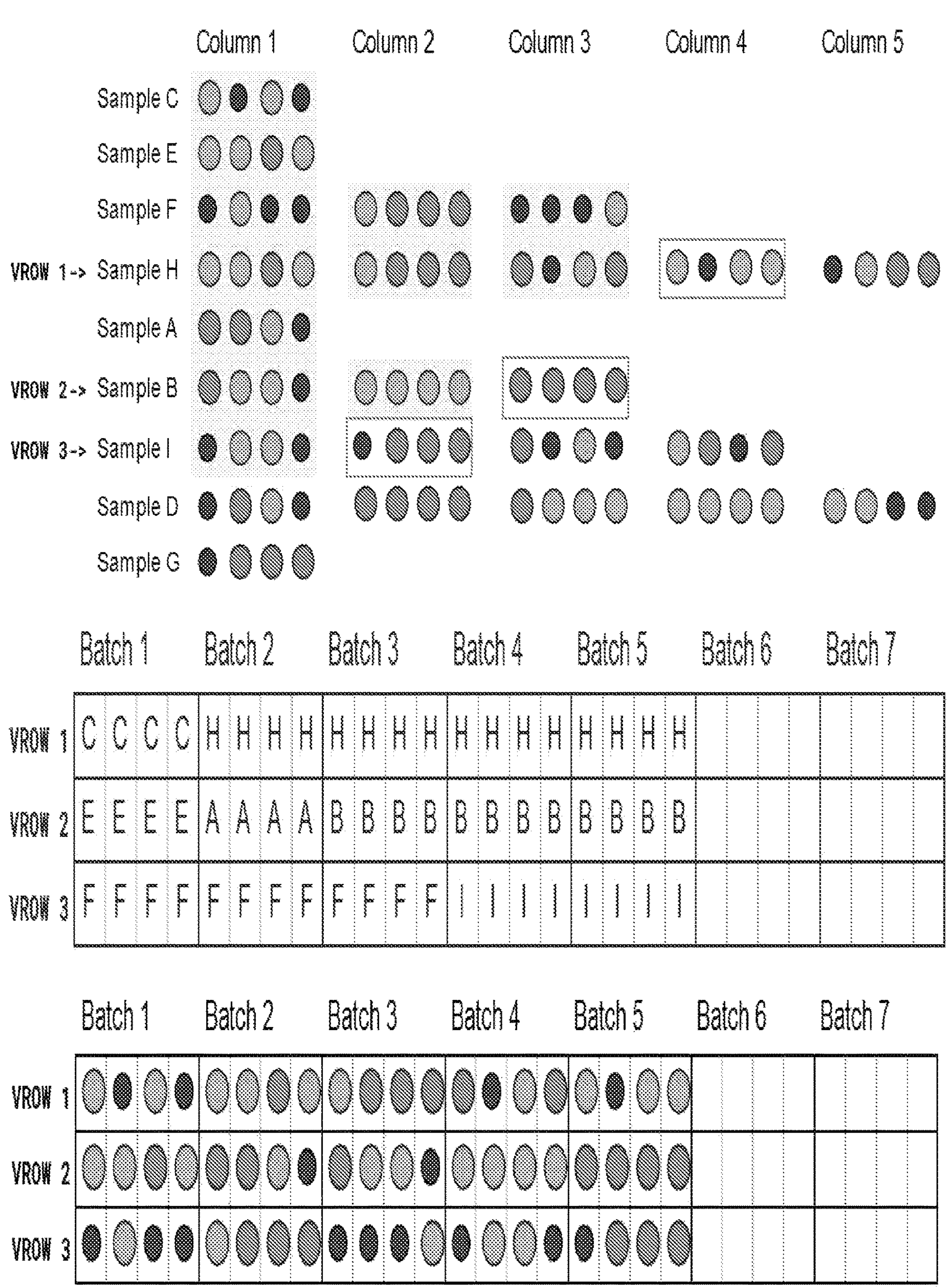

FIG. 29 shows a technique for constructing a fifth virtual batch according to this disclosure. In particular, for a first row of the fifth virtual batch, since row H, which is used in construction of the fourth virtual batch, still has more data to draw from, there is copying of data from row H of data column 4 and insertion of that data, as copied, into the first row of the fifth virtual batch. Further, for a second row of the fifth virtual batch, since row B, which is used in construction of the fourth virtual batch, still has more data to draw from, there is copying of data from row B of column 3 and insertion of that data, as copied, into the second row of the fifth virtual batch. Further, for a third row of the fifth virtual batch, since row I, which is used in construction of the fourth virtual batch, still has more data to draw from, there is copying of data from row I of data column 2 and insertion of that data, as copied, into the third row of the fifth virtual batch.

Figure 30:
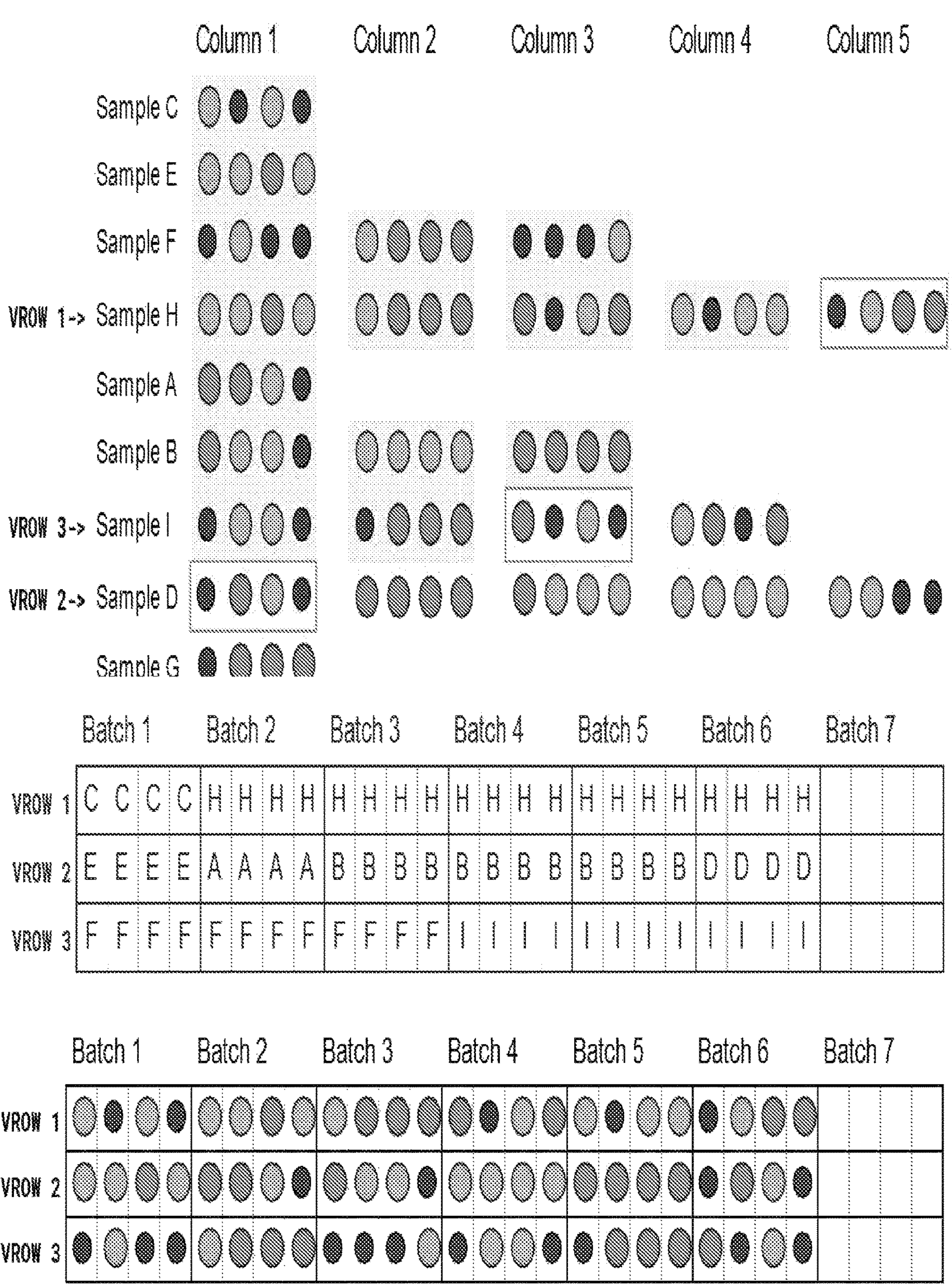

FIG. 30 shows a technique for constructing a sixth virtual batch according to this disclosure. In particular, for a first row of the sixth virtual batch, since row H, which is used in construction of the fifth virtual batch, still has more data to draw from, there is copying of data from row H of data column 5 and insertion of that data into the first row of the sixth virtual batch. Further, for a second row of the sixth virtual batch, since row B, which is used in construction of the fifth virtual batch, contains no more data and a next unused row is a row corresponding to Sample D (row D), there is copying of data from row D of data column 1 and insertion of that data, as copied, into the second row of the sixth virtual batch. Further, for a third row of the sixth virtual batch, since row I, which is used in the fifth virtual batch, still has more data to draw from, there is copying of data from row I of data column 3 into the third row of the sixth virtual batch.

FIG. 31 shows a technique for constructing a seventh virtual batch according to this disclosure. In particular, for a first row of the seventh virtual batch, since row H, which is used in construction of the sixth virtual batch, has no more data and a next unused row is a row corresponding to Sample G (row G), there is copying of data from row G of data column 1 and insertion of that data, as copied, into the first row of the seventh virtual batch. Further, for a second row of the seventh virtual batch, since row D, which is used in construction of the sixth virtual batch, still has more data to draw from, there is copying of data from row D of data column 2 and insertion of that data, as copied, into the second row of the seventh virtual batch. Further, for a third virtual row of the seventh virtual batch, since row I, which is used in construction of the sixth virtual batch, still has more data to draw from, there is copying of data from row I of data column 4 and insertion of that data, as copied, into the third row of the seventh virtual batch.

Note that an eighth virtual batch may be discarded. In particular, for a first row of the eighth virtual batch, row I, which is used in construction of the seventh virtual batch, has no more data. As such, there are no more unused sample rows to select from. Therefore, this partial batch is discarded. Resultantly, the technique of constructing virtual batches is complete.

Figure 32:
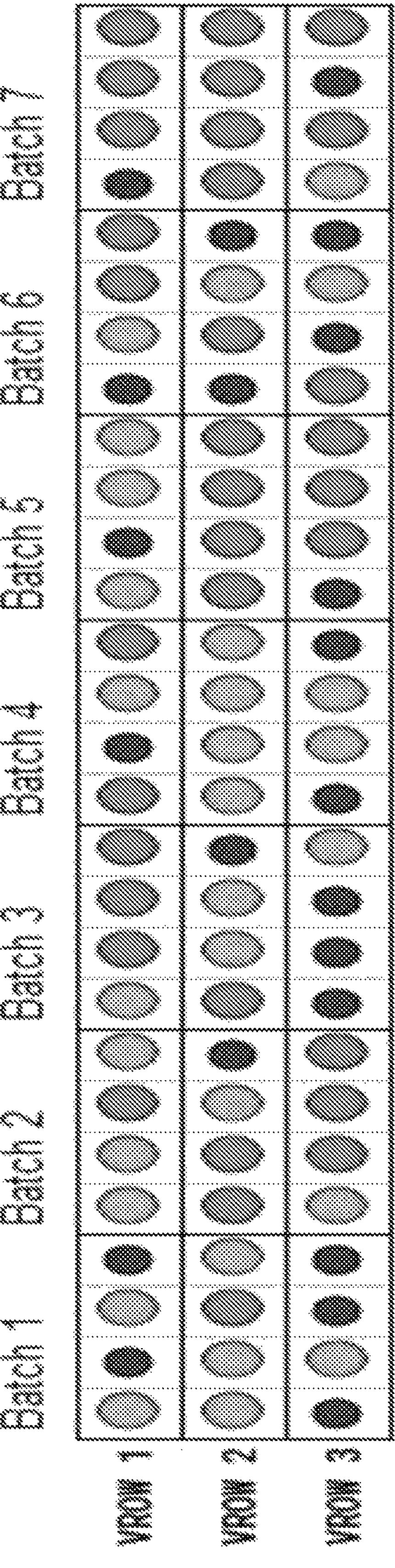

FIG. 32 shows a final virtual batch data organization (e.g., a data structure, an array) containing the first virtual batch, the second virtual batch, the third virtual batch, the fourth virtual batch, the fifth virtual batch, the sixth virtual batch, and the seventh virtual batch. Note that the final virtual batch data organization enables retention of 84 data values out of original 108 data values and there are no gaps in true data. This technologically contrasts what is shown in FIG. 18, where a conventional approach leaves only 48 data values out of original 108 data values, and what is shown in FIG. 21, where a conventional approach with a conventional variance mitigation approach provides 180 data values, most of which are padded, which causes a significant addition of, at best, low-quality data (padded data).

Figure 33:
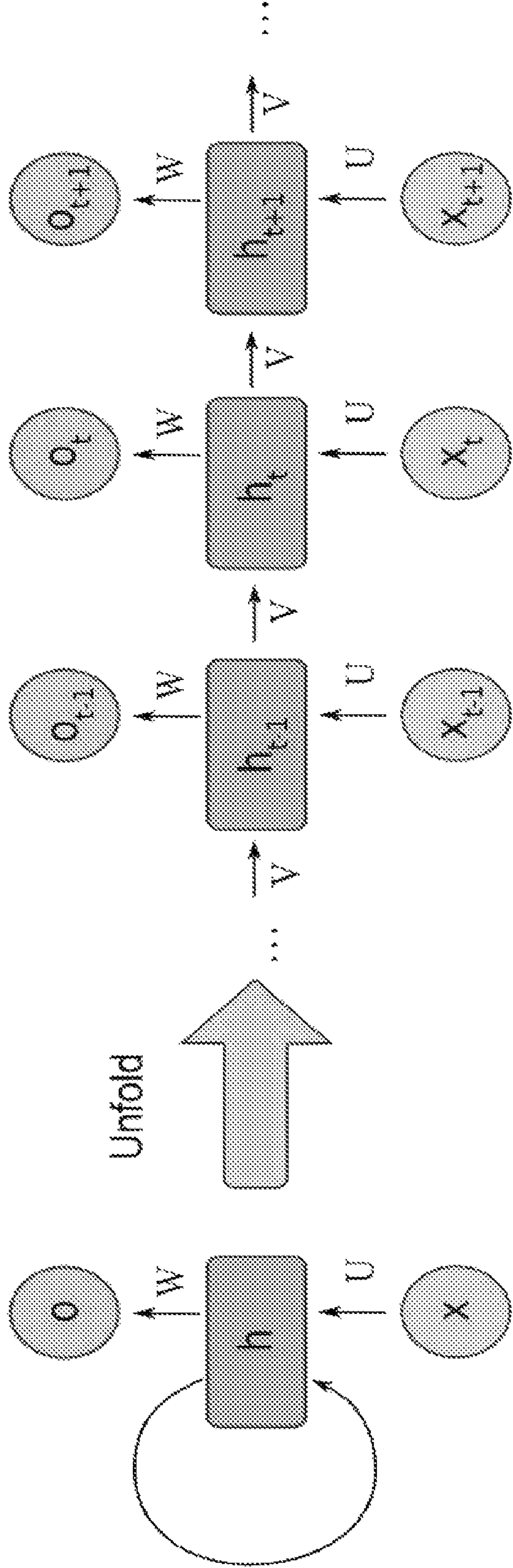
FIGS. 33-35 show various embodiments of various computational techniques for using a virtual batch data organization according to this disclosure.
Figure 34:
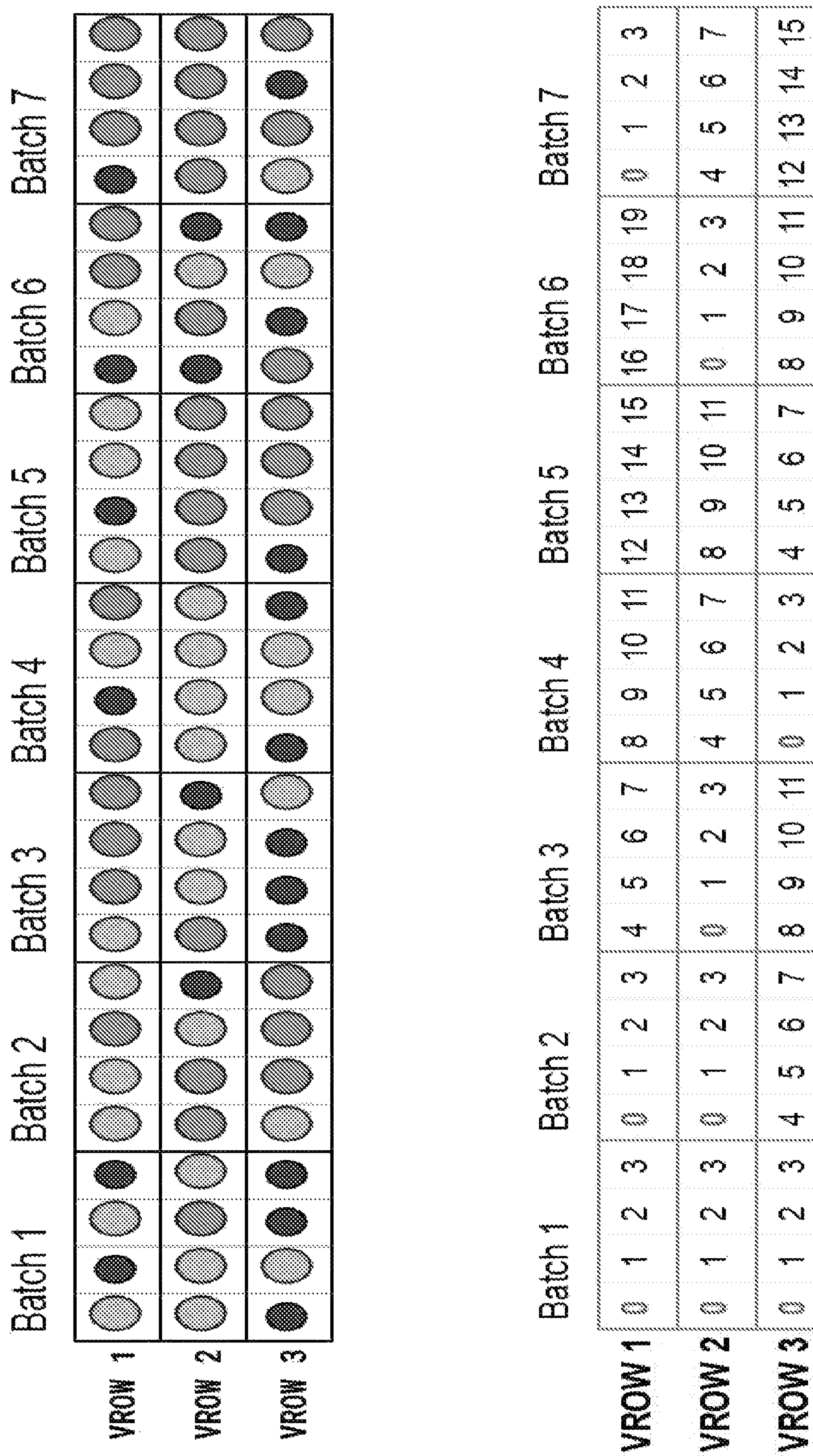
Figure 35:
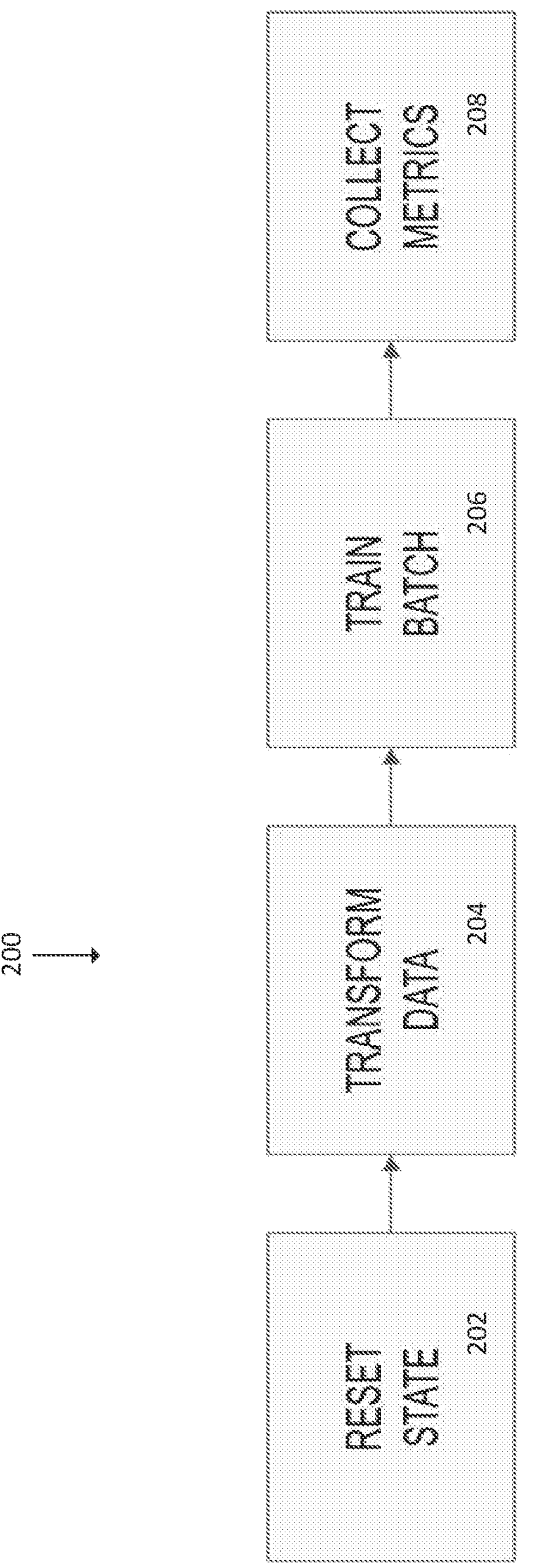

FIGS. 33-35 show various embodiments of various computational techniques for using a virtual batch data organization according to this disclosure. In particular, the final virtual batch data organization shown in FIG. 32 can be used for various data science techniques. One of such techniques is a batch-sensitive state reset in an ANN (e.g., an RNN, an LSTM, a CNN, a convolutional LSTM, a GRU). This technique is a mechanism that manages resetting of states for a model of a stateful RNN.

In an RNN, when processing very long data sequences, a user (e.g., a data scientist) may want to use a pattern of cross-batch statefulness. The RNN may have a layer with an internal state, where the internal state may be reset every time the layer sees a new data batch, i.e., every sample seen by the layer is assumed to be independent from past, or the internal state may retain its state across data batches. If there are very long data sequences (e.g., a 19 channel, 72 hour EEG recording sampled at 200 Hertz (Hz), which is 984, 960,000 (nearly 1 billion) discrete data points for each sample), then for computational efficiency, the user may want segment these very long data sequences into shorter sequences and then feed these shorter sequences sequentially into the layer of the RNN layer, without resetting the internal state of the layer. That way, the layer can retain information about the sequence, in its entirety, even though the layer is only seeing one sub-sequence at a time.

In order to illustrate this function, a diagram of the layer of the RNN is shown in FIG. 33. Within this RNN, there is a mechanism that triggers a reset of an internal state V of the model of the RNN so that the RNN can start processing a new sequence. Various implementations of this mechanism can be implemented in publicly-available machine learning frameworks (e.g., TensorFlow, PyTorch). For example, one of such frameworks can be hosted via the server 104 and the user may operate the client 106 over the network 102 to access such framework. During such implementations, these frameworks assume that when this mechanism is triggered, the internal state of the RNN is reset for all data samples being processed. This assumption is not for various virtual batches, as described above. Therefore, this behavior should be overridden with a custom algorithm in order for training of virtual batches to succeed.

The custom algorithm is batch sensitive. In particular, the custom algorithm resets the internal state of the RNN for just those samples that have been replaced and no others. In order to better illustrate this custom algorithm, as shown in FIG. 34, when data samples are replaced during virtual batch construction, those data samples are tracked in a list (or another data structure). That list is illustrated in FIG. 34, where a number in each cell represents which place within an original data sample (see FIG. 14) a respective data value occurs. Each instance where an index is reset back to zero is a location where one sample was swapped out for another.

In various publicly-available machine learning frameworks, various states of ANNs undergoing training are stored as a matrix of numbers. Resetting a particular state is an act of finding that particular state in the matrix and setting its value to zero. This batch-resetting process deliberately excludes state values that carry information that pertain to sample data that was not replaced.

As described herein, an injectable library (e.g., modules, files) can be programmed for an injection into various publicly-available machine learning frameworks. The library contains computing functions (or other forms of logic) for constructing various virtual batches and various batch-sensitive state resetting mechanisms. In order to take advantage of the library, existing batch construction and state reset routines should not be allowed to run. Instead, the library should be utilized to perform these specific functions.

This utilization can occur in various ways. One way that this utilization can occur is via various publicly-available machine learning frameworks. One of such frameworks is TensorFlow, which can be at least version 2. As such, this utilization in TensorFlow is described herein. However, note that this is illustrative and other publicly-available machine learning frameworks can be similarly used.

As shown in FIG. 35, this utilization of the library can include a process 200 having a set of blocks 202-208. The library is injected into a training process executed by TensorFlow (version 2). In order to override TensorFlow's built-in implementations of these specific functions, there is a replacement of TensorFlow's model.fit method with the custom algorithm, as described herein. The custom algorithm performs the process 200. In particular, the custom algorithm retrieves various batches from a virtual batch construction library, performs a custom state reset of the RNN, as per block 202, applies any data transformations specified by a user (e.g., a data scientist), as per block 204, calls TensorFlow's model.train_on_batch method, as per block 206, and then collect batch metrics, as per block 208.

Block 202 is a reset state block. This action involves entering the model of the RNN while the model is being trained and, layer-by-layer, reset all internal states for all data samples that were replaced.

Block 204 is a transform data block. This action allows for transformation of data (e.g., from a first data standard to a second data standard). In particular, various publicly-available machine learning frameworks can be programmed to enable the user (e.g., a data scientist) with at least some ability to specify a collection of transforms. A transform can be any function that transforms data (e.g., input data are temperature readings recorded in Fahrenheit and a transformation function may convert those values to Celsius). By design, an action (e.g., last action) that various publicly-available machine learning frameworks can make before executing various training algorithms is to pass at least some batch data as input to various transform functions and replace those values with an output of the transform functions. The custom algorithm can follow this practice.

Block 206 is a train batch block. A routine (or another form of computing software or hardware logic), using the model of the RNN provided by the user before training, runs a single gradient update on a single batch of virtualized data samples. A gradient update can include a change to various weights of the model of the RNN required to minimize at least some error for that training sample. A linear direction (either positive or negative) and a magnitude of a change that will be applied to each of the weights is determined by calculating a derivative of a cost function provided by the user before training, with respect to each of the weights, whose magnitude is tuned by a learning rate. Both the cost function and the learning rate can be provided by the user.

Block 208 is a collect metrics block. The custom algorithm appends various output metrics (e.g., loss, accuracy) from a single training step to a list of batch metrics. Those metrics can be used by the user for other various tasks. Some of such tasks can include displaying in a console as interim output in order to assess whether the model of the RNN is learning or not in order to engage a stopping mechanism. Note that when batch processing is utilized for training the model of the RNN, such batch processing can also be utilized for validation and prediction.

In some embodiments, data sample segments can be batched together by size. For each of such batch, there can be a cutting of all segments down to a smallest size segment size for that batch. In some embodiments, data sample batches can be constructed with various variable-length segments. Therefore, when a segment ends, then its weight is set to 0 so that the segment no longer influences the training of the RNN. Although, in some circumstances, this approach could be less efficient by increasing training time by an order of magnitude, this is still possible.

Note that various data samples, as described herein, can include alphanumerics, whole or decimal or positive or negative numbers, text or words, or other data types. These data samples can be sourced from a single data source or a plurality of data sources as time series or non-fixed-length time spans or other forms of discretized, parsed, or tokenized data. Some of such data sources can include electrodes, sensors, motors, actuators, circuits, valves, receivers, transmitters, transceivers, processors, servers, industrial equipment, electrical energy loads, microphones, cameras, radars, LiDARs, sonars, hydrophones, or other physical devices, whether positionally stationary (e.g., weather, indoor or outdoor climate, earthquake, traffic or transportation, fossil fuel or oil or gas) or positionally mobile, whether land-based, marine-based, aerial-based, or satellite-based. Some examples of such data sensors can include an EEG lead, although other human or mammalian bioinformatic sensors, whether worn or implanted (e.g., head, neck, torso, spine, arms, legs, feet, fingers, toes) can be included. Some examples of such human or mammalian bioinformatics sensors can be embodied with medical devices or wearables. Some examples of such medical devices or wearables include headgear, headsets, headbands, head-mounted displays, hats, skullcaps, garments, bandages, sleeves, vests, patches, footwear, or others. Some examples of various use cases involving such medical devices or wearables can include diagnosing, forecasting, preventing, or treating neurological conditions or disorders or events based on data samples from an EEG lead (or other bioinformatic sensors). Some examples of such neurological conditions or disorders or events include epilepsy, seizures, or others.

In addition, features described with respect to certain example embodiments may be combined in or with various other example embodiments in any permutational or combinatory manner. Different aspects or elements of example embodiments, as disclosed herein, may be combined in a similar manner. The term "combination", "combinatory," or "combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The present disclosure may be embodied in a system, a method, and/or a computer program product. The computer program product may include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. A code segment or machine-executable instructions may represent a procedure, a function, a subprogram, a program, a routine, a subroutine, a module, a software package, a class, or any combination of instructions, data structures, or pro-gram statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, among others. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. The various illustrative logical blocks, modules, circuits, and algorithm steps described in connection with the embodiments disclosed herein may be implemented as electronic hardware, computer soft-ware, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

Features or functionality described with respect to certain example embodiments may be combined and sub-combined in and/or with various other example embodiments. Also, different aspects and/or elements of example embodiments, as dis-closed herein, may be combined and sub-combined in a similar manner as well. Further, some example embodiments, whether individually and/or collectively, may be components of a larger system, wherein other procedures may take precedence over and/or otherwise modify their application. Additionally, a number of steps may be required before, after, and/or concurrently with example embodiments, as disclosed herein. Note that any and/or all methods and/or processes, at least as disclosed herein, can be at least partially performed via at least one entity or actor in any manner.

Although various embodiments have been depicted and described in detail herein, skilled artisans know that various modifications, additions, substitutions and the like can be made without departing from this disclosure. As such, these modifications, additions, substitutions and the like are considered to be within this disclosure.

The invention claimed is:

1. A method of preserving signals in data inputs with moderate to high levels of variances in data sequence lengths for artificial neural network model training, the method comprising:

accessing, by a processor, a data series containing a plurality of data samples that are organized in a first order within the data series, wherein each of the data samples contains a plurality of data values that are sequentially arranged within that respective data sample, wherein the data samples have a plurality of sequence lengths that vary from each other based on the data values in those respective data samples;

randomizing, by the processor, the data samples within the data series such that the data samples are organized in a second order within the data series, wherein the first order is different from the second order;

segmenting, by the processor, the data series organized in the second order according to a window size such that the data series are segmented into a plurality of data columns sized based on the window size;

removing, by the processor, all of the data values of each respective data sample that does not satisfy the window size within each respective data column such that a modified data series remains;

constructing, by the processor, a plurality of virtual batches from the modified data series such that the virtual batches (a) each has a plurality of rows according to a batch size, (b) each is sized according to the window size and the batch size, (c) have the rows list all of the data values from the modified data series, and (d) have each of the rows sequentially contain the data values from only one of the data samples of the modified data series; and overriding, by the processor, a default behavior of a machine learning framework such that a model of an artificial neural network (ANN) is trained based on the virtual batches.

2. The method of claim 1, wherein the virtual batches are consecutive, wherein at least two of the rows of the virtual batches contain the data values from the one of the data samples from at least two of the data columns when the virtual batches are viewed as if positioned immediately adjacent to each other and the rows are consecutive.

3. The method of claim 1, wherein at least one of the virtual batches that is not an initial virtual batch is constructed at least by determining whether the data sample in the modified data series is exhausted for all of the data columns other than an initial data column.

4. The method of claim 3, wherein the at least one of the virtual batches that is not the initial virtual batch is constructed at least by determining a next unused row in the initial data column, wherein the next unused row is within the batch size of the at least one of the virtual batches that is not the initial virtual batch.

5. The method of claim 4, wherein the at least one of the virtual batches that is not the initial virtual batch has an initial row that is populated with the data values from the next unused row in the initial data column.

6. The method of claim 5, wherein the at least one of the virtual batches that is not the initial virtual batch is constructed at least by population from the data values of the data sample other than from the initial data column.

7. The method of claim 6, wherein the at least one of the virtual batches that is not the initial virtual batch is constructed at least by population from the data values from one of the data columns that immediately follows the initial data column.

8. The method of claim 1, wherein the ANN is a stateful recurrent neural network (RNN).

9. The method of claim 1, wherein the default behavior is overridden at least by resetting a state of the ANN for just those of the data samples that have been replaced and no others.

10. A system for preserving signals in data inputs with moderate to high levels of variances in data sequence lengths for artificial neural network model training, the system comprising:

a server comprising a processor programmed to:

access a data series containing a plurality of data samples that are organized in a first order within the data series, wherein each of the data samples contains a plurality of data values that are sequentially arranged within that respective data sample, wherein the data samples have a plurality of sequence lengths that vary from each other based on the data values in those respective data samples;

randomize the data samples within the data series such that the data samples are organized in a second order within the data series, wherein the first order is different from the second order;

segment the data series organized in the second order according to a window size such that the data series are segmented into a plurality of data columns sized based on the window size;

remove all of the data values of each respective data sample that does not satisfy the window size within each respective data column such that a modified data series remains;

construct a plurality of virtual batches from the modified data series such that the virtual batches (a) each has a plurality of rows according to a batch size, (b) each is sized according to the window size and the batch size, (c) have the rows list all of the data values from the modified data series, and (d) have each of the rows sequentially contain the data values from only one of the data samples of the modified data series; and override a default behavior of a machine learning framework such that a model of an artificial neural network (ANN) is trained based on the virtual batches.

11. The system of claim 10, wherein the virtual batches are consecutive, wherein at least two of the rows of the virtual batches contain the data values from the one of the data samples from at least two of the data columns when the virtual batches are viewed as if positioned immediately adjacent to each other and the rows are consecutive.

12. The system of claim 10, wherein at least one of the virtual batches that is not an initial virtual batch is constructed at least by determining whether the data sample in the modified data series is exhausted for all of the data columns other than an initial data column.

13. The system of claim 12, wherein the at least one of the virtual batches that is not the initial virtual batch is constructed at least by determining a next unused row in the initial data column, wherein the next unused row is within the batch size of the at least one of the virtual batches that is not the initial virtual batch.

14. The system of claim 13, wherein the at least one of the virtual batches that is not the initial virtual batch has an initial row that is populated with the data values from the next unused row in the initial data column.

15. The system of claim 14, wherein the at least one of the virtual batches that is not the initial virtual batch is constructed at least by population from the data values of the data sample other than from the initial data column.

16. The system of claim 15, wherein the at least one of the virtual batches that is not the initial virtual batch is constructed at least by population from the data values from one of the data columns that immediately follows the initial data column.

17. The system of claim 10, wherein the ANN is a stateful recurrent neural network (RNN).

18. The system of claim 10, wherein the default behavior is overridden at least by resetting a state of the ANN for just those of the data samples that have been replaced and no others.

* * * * *